United States Patent
Dias et al.

(10) Patent No.: US 8,352,607 B2
(45) Date of Patent: *Jan. 8, 2013

(54) CO-LOCATION AND OFFLOADING OF WEB SITE TRAFFIC BASED ON TRAFFIC PATTERN RECOGNITION

(75) Inventors: Daniel Manuel Dias, Mohegan Lake, NY (US); Richard Pervin King, Scarsdale, NY (US); Zhen Liu, Tarrytown, NY (US); Mark Steven Squillante, Pound Ridge, NY (US); Honghui Xia, Croton on Hudson, NY (US); Shun-Zheng Yu, Guangzhou (CN); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 882 days.

This patent is subject to a terminal disclaimer.

(21) Appl. No.: 11/952,641

(22) Filed: Dec. 7, 2007

(65) Prior Publication Data
US 2008/0091826 A1 Apr. 17, 2008

Related U.S. Application Data

(63) Continuation of application No. 10/315,335, filed on Dec. 10, 2002, now Pat. No. 7,386,611.

(51) Int. Cl.
*G06F 15/173* (2006.01)
*G01R 31/08* (2006.01)
*G06F 7/00* (2006.01)

(52) U.S. Cl. ........ 709/226; 709/224; 709/225; 370/241; 707/803

(58) Field of Classification Search .................. 709/226
See application file for complete search history.

(56) References Cited

U.S. PATENT DOCUMENTS

| 6,119,143 A | 9/2000 | Dias et al. |
| 6,185,601 B1 | 2/2001 | Wolff |
| 6,253,230 B1 | 6/2001 | Couland et al. |

(Continued)

FOREIGN PATENT DOCUMENTS

JP 9044381 A 2/1997

OTHER PUBLICATIONS

"Cluster Analysis", StaSoft, Oct. 17, 2000, retrieved Apr. 3, 2006 from http: //web.archive.org/web/20001017022353/hftp://www.statsoft.com/textbook/stcluan.html.

(Continued)

*Primary Examiner* — Backhean Tiv
*Assistant Examiner* — Alan S Chou
(74) *Attorney, Agent, or Firm* — Yee & Associates, P.C.; William Stock

(57) ABSTRACT

Identifying traffic patterns to web sites based on templates that characterize the arrival of traffic to the web sites is provided. Based on these templates, determinations are made as to which web sites should be co-located so as to optimize resource allocation. Web sites whose templates are complimentary, i.e. a first web site having a peak in arrival traffic at time $t1$ and a second web site that has a trough in arrival traffic at time $t1$, are designated as being candidates for co-location. In addition, the templates identified for the traffic patterns of web sites are used to determine thresholds for offloading traffic to other servers. These thresholds include a first threshold at which offloading should be performed, a second threshold that takes into consideration the lead time needed to begin offloading, and a third threshold that takes into consideration a lag time needed to stop offloading of traffic.

9 Claims, 16 Drawing Sheets

U.S. PATENT DOCUMENTS

| | | | |
|---|---|---|---|
| 6,263,361 | B1 | 7/2001 | Hoyer et al. |
| 6,308,210 | B1 * | 10/2001 | Fields et al. ............... 709/224 |
| 6,311,219 | B1 | 10/2001 | Factor |
| 6,351,775 | B1 | 2/2002 | Yu |
| 6,374,297 | B1 | 4/2002 | Wolf et al. |
| 6,502,131 | B1 | 12/2002 | Vaid et al. |
| 6,662,227 | B2 | 12/2003 | Boyd et al. |
| 6,728,748 | B1 * | 4/2004 | Mangipudi et al. ........... 718/105 |
| 6,766,370 | B2 | 7/2004 | Glommen et al. |
| 6,778,991 | B2 | 8/2004 | Tenorio |
| 6,801,945 | B2 | 10/2004 | Lin et al. |
| 6,877,035 | B2 | 4/2005 | Shahabuddin et al. |
| 6,947,985 | B2 | 9/2005 | Hegli et al. |
| 7,096,200 | B2 | 8/2006 | Wang et al. |
| 7,103,651 | B2 | 9/2006 | Bohannon et al. |
| 7,386,611 | B2 | 6/2008 | Dias et al. |
| 7,406,532 | B2 | 7/2008 | Kryskow, Jr. et al. |
| 7,433,304 | B1 * | 10/2008 | Galloway et al. ............. 370/229 |
| 7,693,993 | B2 | 4/2010 | Sheets et al. |
| 7,792,951 | B2 | 9/2010 | Halim et al. |
| 2002/0112036 | A1 | 8/2002 | Bohannon et al. |
| 2002/0143945 | A1 * | 10/2002 | Shahabuddin et al. ....... 709/226 |
| 2003/0200175 | A1 | 10/2003 | Wang et al. |
| 2004/0111504 | A1 | 6/2004 | Halim et al. |
| 2004/0111508 | A1 | 6/2004 | Dias et al. |
| 2005/0182838 | A1 * | 8/2005 | Sheets et al. ............... 709/226 |
| 2007/0124461 | A1 | 5/2007 | Kryskow, Jr. et al. |

OTHER PUBLICATIONS

Baker et al., "Distributed Cooperative Web Servers," Computer Networks, 31(11-16):1215-1229, May 1999.

Liu et al., "Profile-Based Traffic Characterization of Commercial Web Sites," Proceedings of the 18th International Teletraffic Congress, 5a:231-240, 2003.

Marchette, "A Statistical Method for Profiling Network Traffic," Proceedings of the Workshop on Intrusion Detection and Network Monitoring, Berkeley, California, pp. 119-128, Apr. 9-12, 1999.

Office Action regarding U.S. Appl. No. 101315,335, dated Mar. 3, 2006, 11 pages.

Response to Office Action regarding U.S. Appl. No. 10/315,335, dated Jun. 5, 2006, 15 pages.

Final Office Action regarding U.S. Appl. No. 10/315,335, dated Jul. 19, 2006, 12 pages.

Office Action regarding U.S. Appl. No. 10/315,335, dated Feb. 8, 2007, 5 pages.

Response to Office Action regarding U.S. Appl. No. 10/315,335, dated May 7, 2007, 15 pages.

Notice of Allowance regarding U.S. Appl. No. 10/315,335, dated Aug. 22, 2007, 6 pages.

Office Action regarding U.S. Appl. No. 10/315,705, dated Apr. 10, 2006, 10 pages.

Final Office Action regarding U.S. Appl. No. 10/315,705, dated Sep. 15, 2006, 10 pages.

Appeal Brief regarding U.S. Appl. No. 10/315,705, dated Jan. 8, 2007, 34 pages.

Decision on Appeal regarding U.S. Appl. No. 10/315,705, dated Feb. 2, 2010, 17 pages.

Notice of Allowance regarding U.S. Appl. No. 10/315,705, dated Apr. 30, 2010, 14 pages.

* cited by examiner

CO-LOCATION AND OFFLOADING OF WEB SITE TRAFFIC BASED ON TRAFFIC PATTERN RECOGNITION

RELATED APPLICATION

This application is a continuation of application number 10/315,335, filed Dec. 10, 2002, and issued as U.S. Pat. No. 7,386,611.

This application is related to commonly assigned U.S. patent application Ser. No. 10/315,705, issued on Sep. 7, 2010 as U.S. Pat. No. 7,792,951, entitled "APPARATUS AND METHODS FOR CLASSIFICATION OF WEB SITES", filed on Dec. 10, 2002, and hereby incorporated by reference.

BACKGROUND OF THE INVENTION

1. Technical Field

The present invention is directed to apparatus and methods for co-location and off-loading of web site traffic based on traffic pattern recognition. More specifically, the present invention is directed to apparatus and methods for profiling web sites, determining which web sites should be co-located and when offloading of web traffic to other servers should be performed.

2. Description of Related Art

With the increasing popularity of the Internet and its applications, the allocation of resources in order to provide a Quality of Service (QoS) has become more difficult. The complexity of the problem of resource allocation is exacerbated by the heterogeneity of the Internet infrastructure and applications as well as the user behaviors.

One approach to the resource allocation problem is to share resources, such as web servers, among multiple entities, such as web sites, so that peak load conditions for any given entity can be handled by borrowing resources from other entities. Such a mechanism is often referred to as co-location. An important problem in this paradigm is concerned with the clustering of the web sites for the resource sharing. That is, it is often difficult and imprecise manual process to identify which web sites should share resources.

Another approach, which is complementary to co-location, consists of offloading work for an entity to exogenous resources in a dynamic way. With offloading, web site traffic that is destined for a particular web server that is currently in an overloaded state is redirected to another server to handle the processing of the traffic. A key problem with offloading is determining where and when to offload the work. The known mechanisms for determining where and when to offload work typically fall into the area of load balancing where current state information is used to determine if the work load should be balanced by sending some of the work to other servers. Such work load balancing mechanisms are reactionary and do not make use of known patterns of traffic to begin offloading prior to the servers becoming overloaded.

Thus, it would be beneficial to have an improved apparatus and method for determining which web sites should be co-located and when traffic to web sites should be offloaded to other web servers.

SUMMARY OF THE INVENTION

The present invention provides apparatus and methods for identifying traffic patterns to web sites based on templates that characterize the arrival of traffic to the web sites. Based on these templates, determinations are made as to which web sites should be co-located so as to optimize resource allocation. Specifically, web sites whose templates are complimentary, i.e. a first web site having a peak in arrival traffic at time t1 and a second web site that has a trough in arrival traffic at time t1, are designated as being candidates for co-location.

In addition, the present invention uses the templates identified for the traffic patterns of web sites to determine thresholds for offloading traffic to other servers. These thresholds include a first threshold at which offloading should be performed, a second threshold that takes into consideration the lead time needed to begin offloading, and a third threshold that takes into consideration a lag time needed to stop all offloading of traffic to the other servers.

These an other feature and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The preferred embodiments of the present invention are implemented in a distributed data processing environment in which traffic data is compiled and used to profile, cluster and categorize web sites. Since the present invention is implemented in a distributed data processing environment, a brief description of this environment will first be provided in order to provide a context in which the present invention operates.

Figure 1:
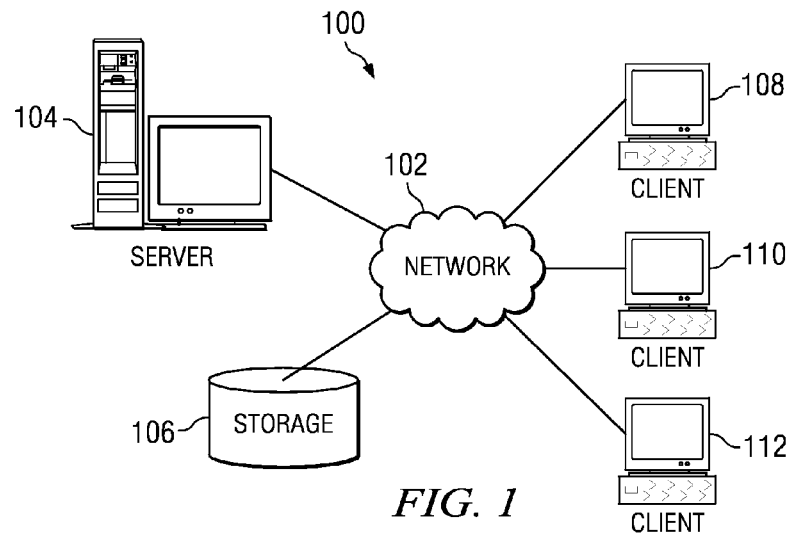
FIG. 1 is an exemplary diagram of a distributed data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
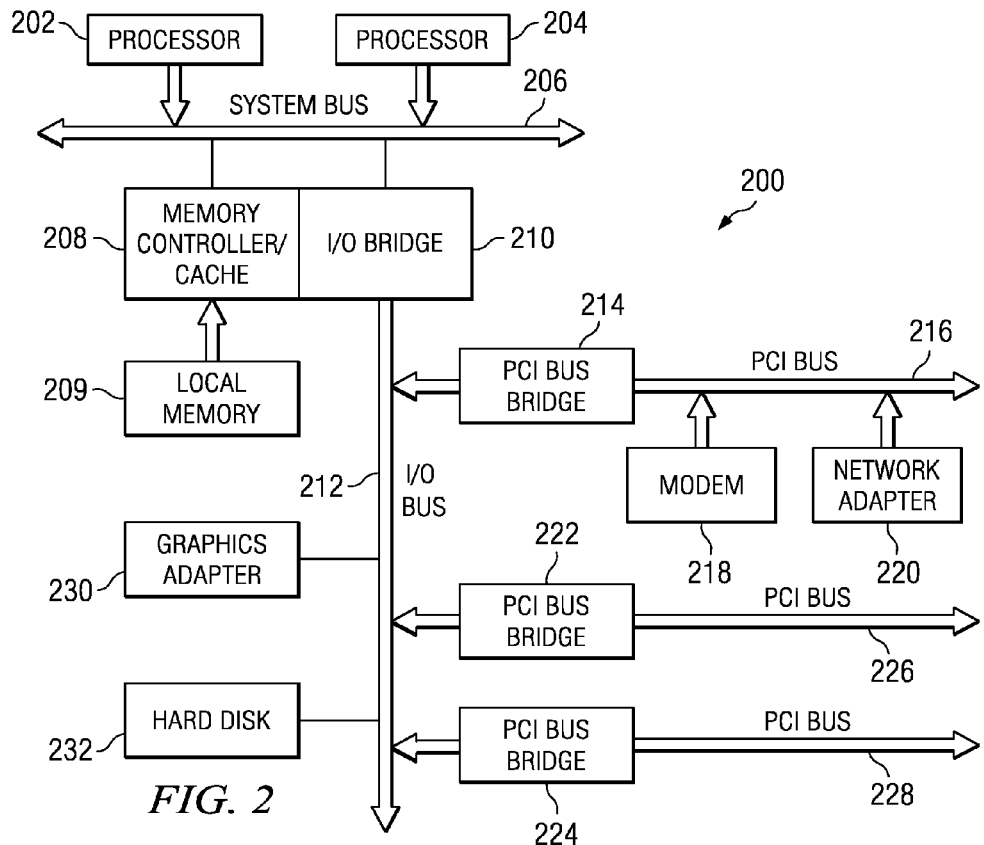
FIG. 2 is an exemplary block diagram of a server computing device according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
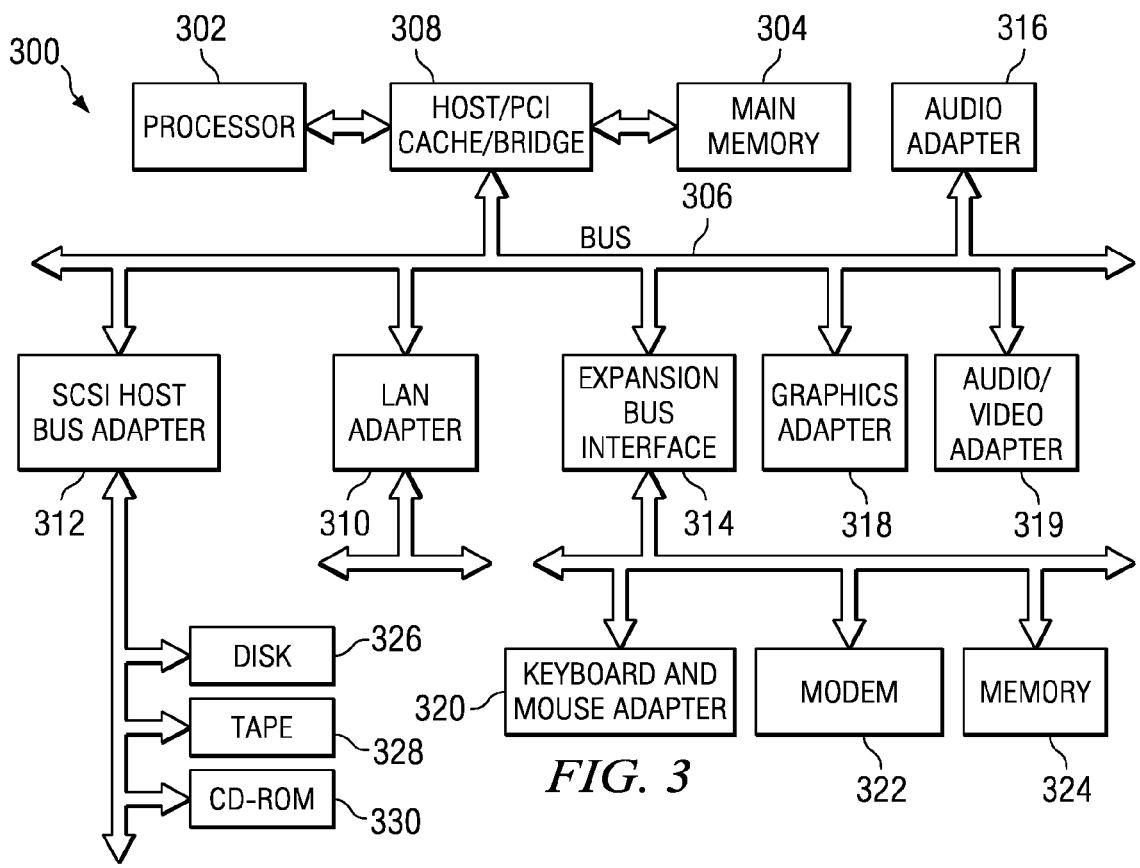
FIG. 3 is an exemplary block diagram of a client computing device according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned previously, the present invention provides a mechanism for categorizing web sites. Such categorization is a support functionality for use in workload characterization, performance modeling, workload and performance forecasting, capacity planning, and the like. Basically, each of these various functions are directed to optimizing resource utilization and making sure that there are enough resources available to handle the traffic experienced by the web site in order to give a determined level of service to client devices. Web site categorization according to the present invention may be a principle support function for ensuring accurate modeling of the web site for use in these other functions.

A fundamental part of the present invention is the discovery that web sites have repeated patterns of traffic characteristics that may be exploited to help solve the problems of workload characterization, performance modeling, workload and performance forecasting, and capacity planning. These patterns may exist for various different measures including number of hits, bytes, page views, visits, hits per visit, page views per visit, seconds per page view, seconds per visit, and the like. Moreover, these patterns may exist for various time scales including monthly, weekly, daily, hourly, and the like. To illustrate the repeated patterns of traffic characteristics, the number of hits per hour over a week time interval for a plurality of exemplary commercial web sites will be considered.

Figure 4A:
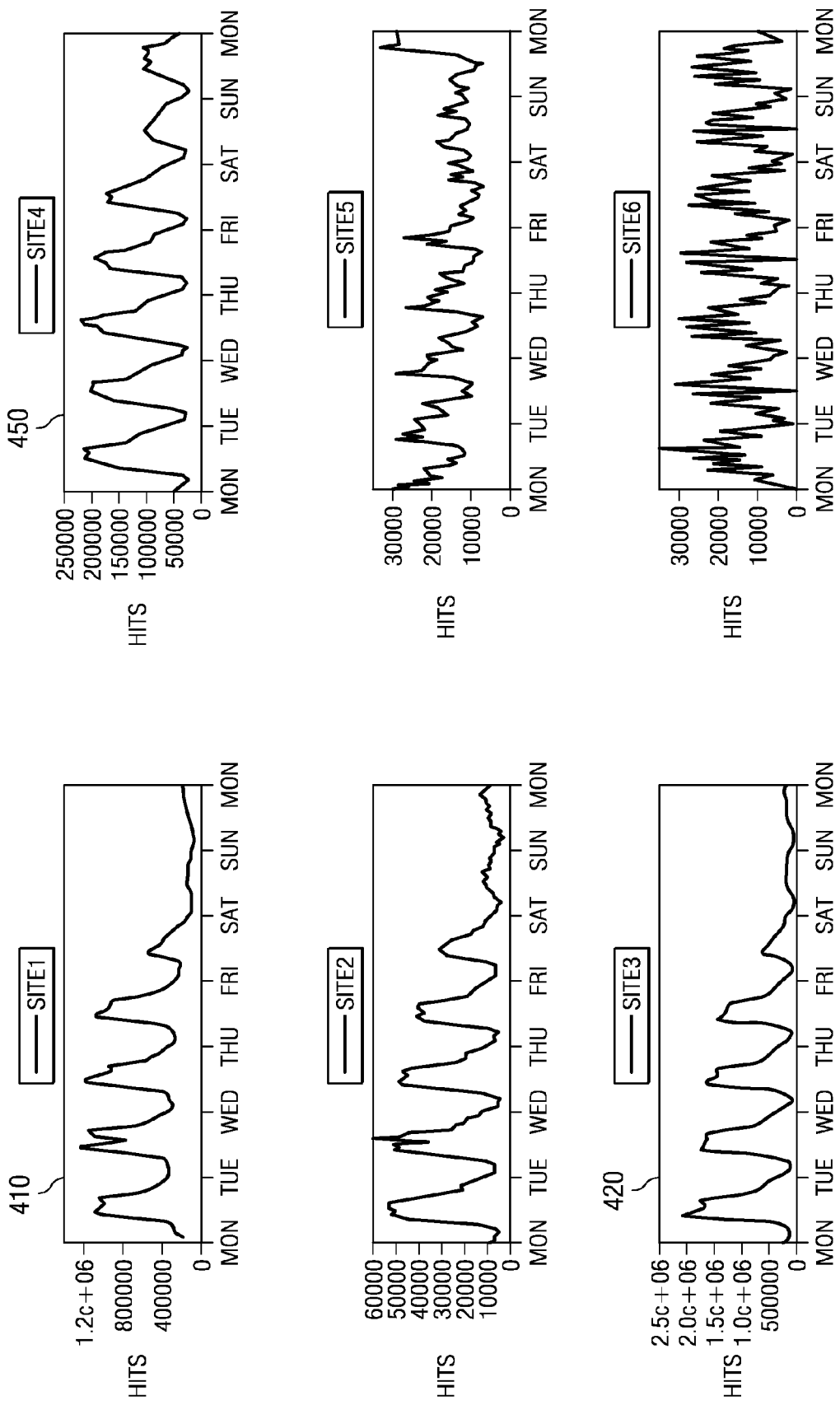
FIGS. 4A-4C are exemplary diagrams of hourly hits over a period of one week for exemplary commercial web sites.
Figure 4B:
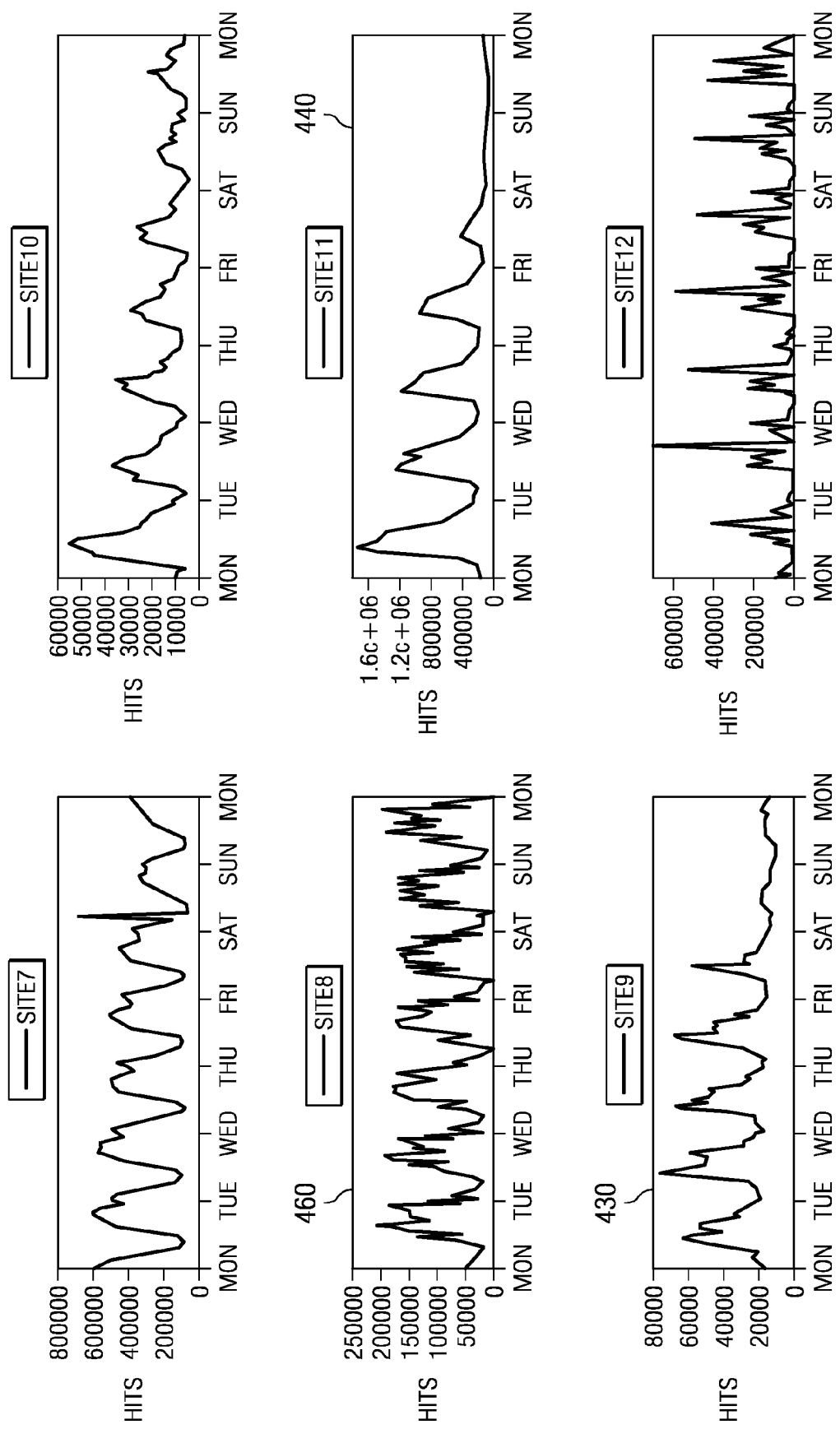
Figure 4C:
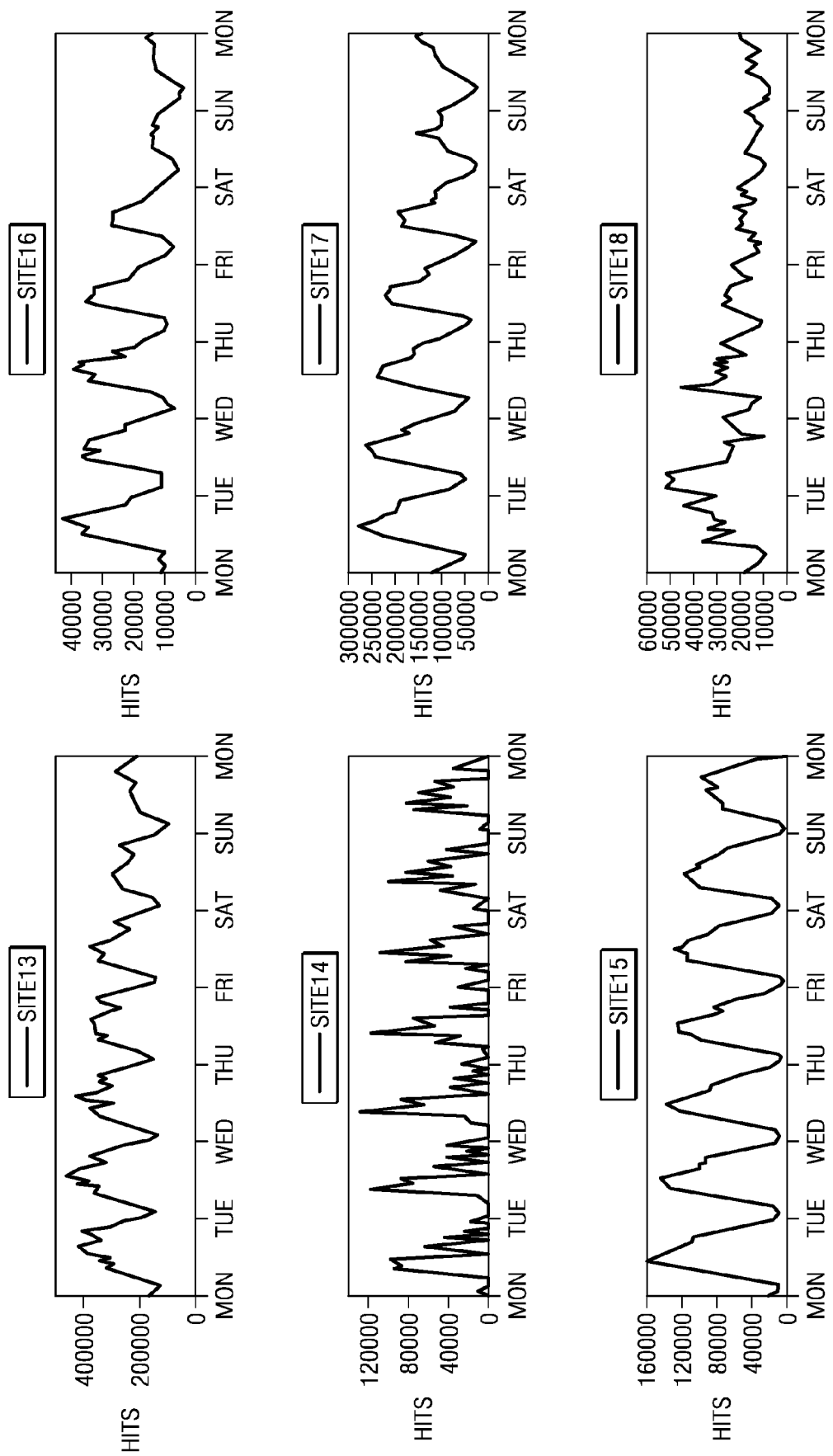

FIGS. 4A-4C are exemplary diagrams of hourly hits over a period of one week for exemplary commercial web sites. In the plots shown in FIGS. 4A-4C, the measure of number of hits per hour is used to characterize the incoming request patterns from client devices over each day of the week.

As can be seen from FIGS. 4A-4C, a large number of web sites exhibit daily access patterns for which there is a considerable drop in the request rate (both hits and pages) over Saturdays and Sundays relative to the other days of the week. Some of the web sites across different industries often have clear weekend patterns, as illustrated in the first plot 410, the third plot 420, the ninth plot 430 and the eleventh plot 440 in FIGS. 4A and 4B, where there is a significant drop in the request rate over the weekend. Other web sites, such as 450 have weaker yet still prevalent weekend patterns with less significant drops in the request rate over the weekend. Still other web sites, such as 460, do not exhibit any weekend patterns.

Figure 5A:
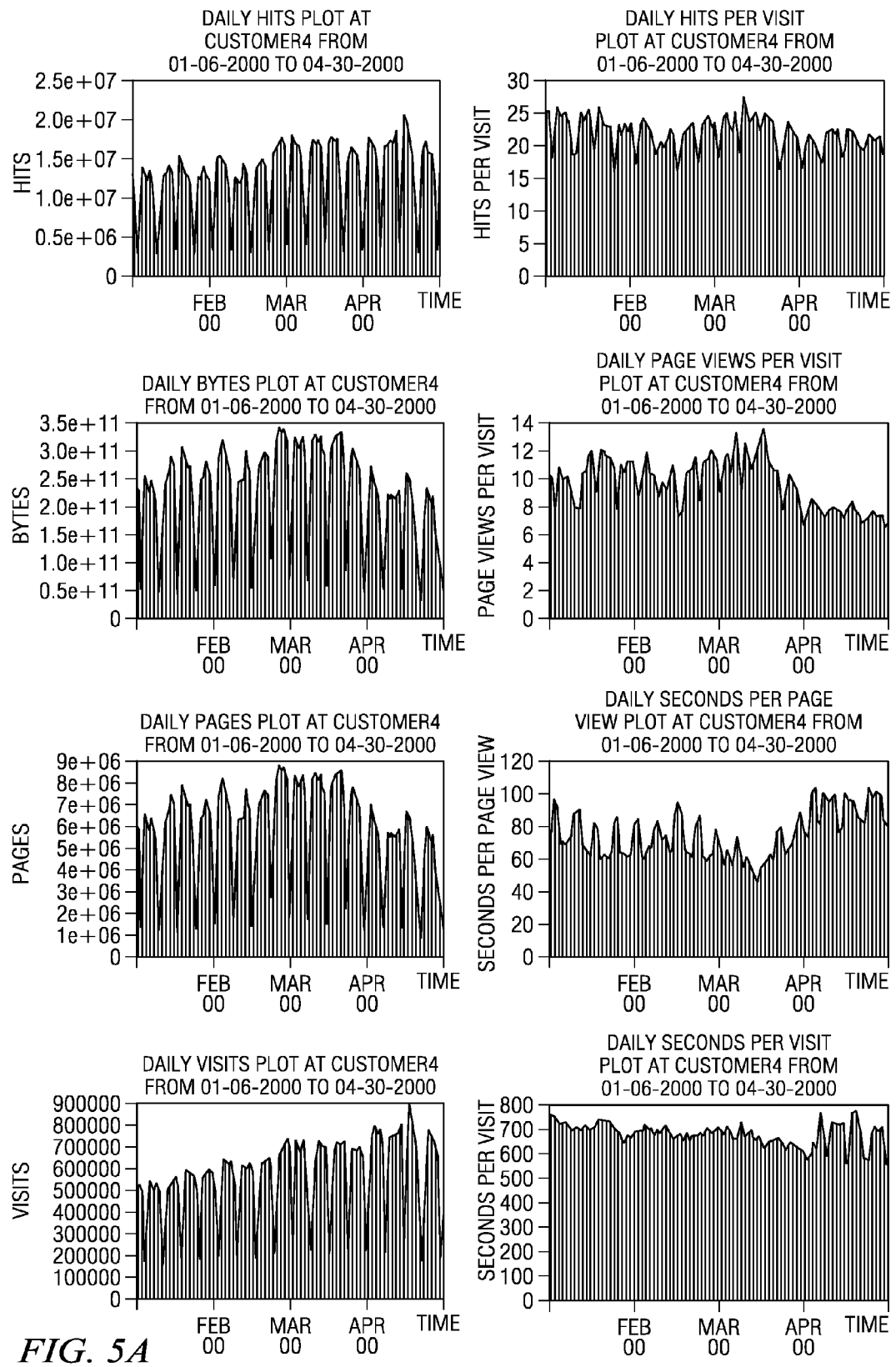
FIGS. 5A-5C are exemplary diagrams of daily time-series plots of the exemplary commercial web sites in FIGS. 4A-4C.
Figure 5B:
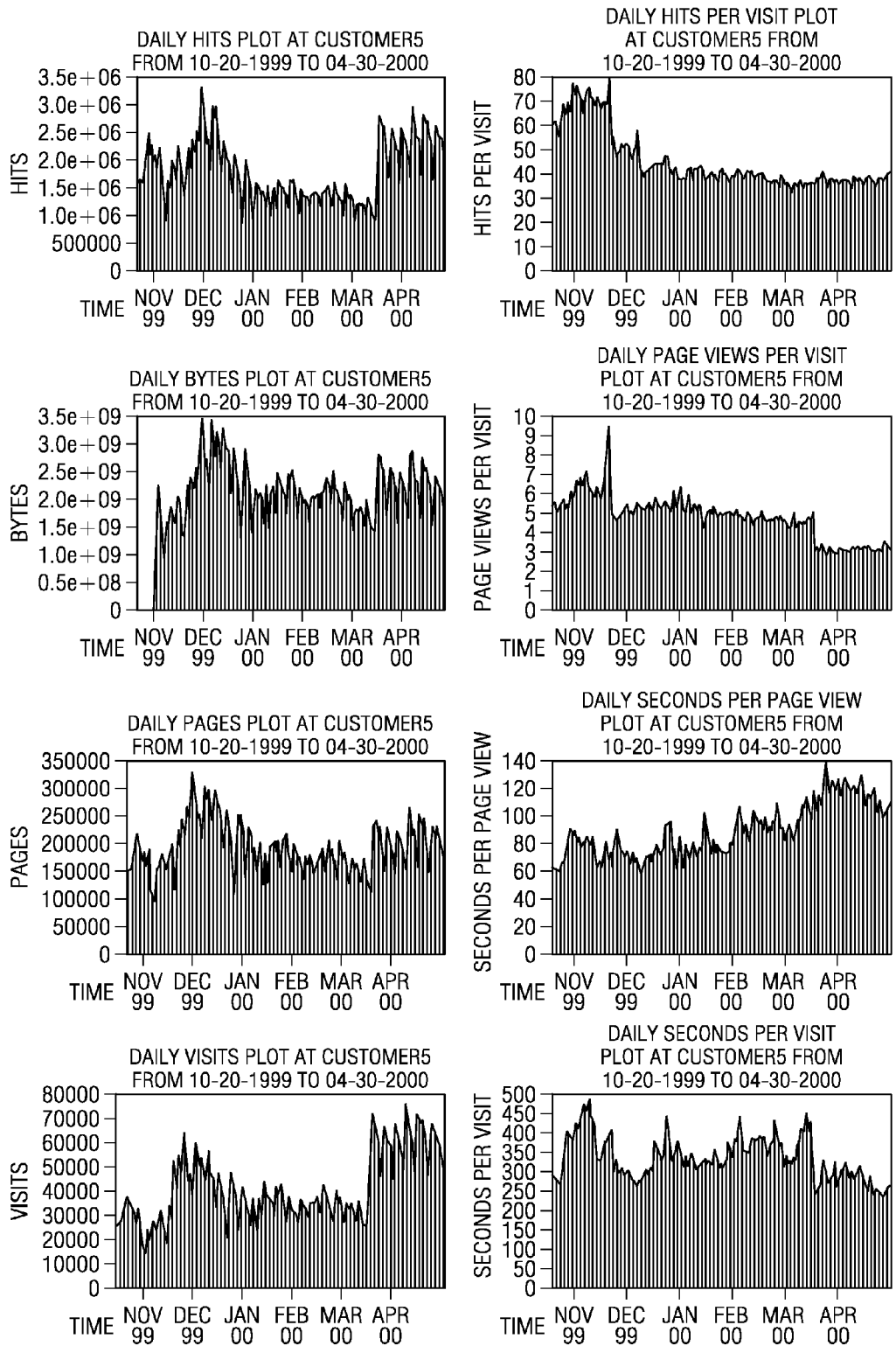
Figure 5C:
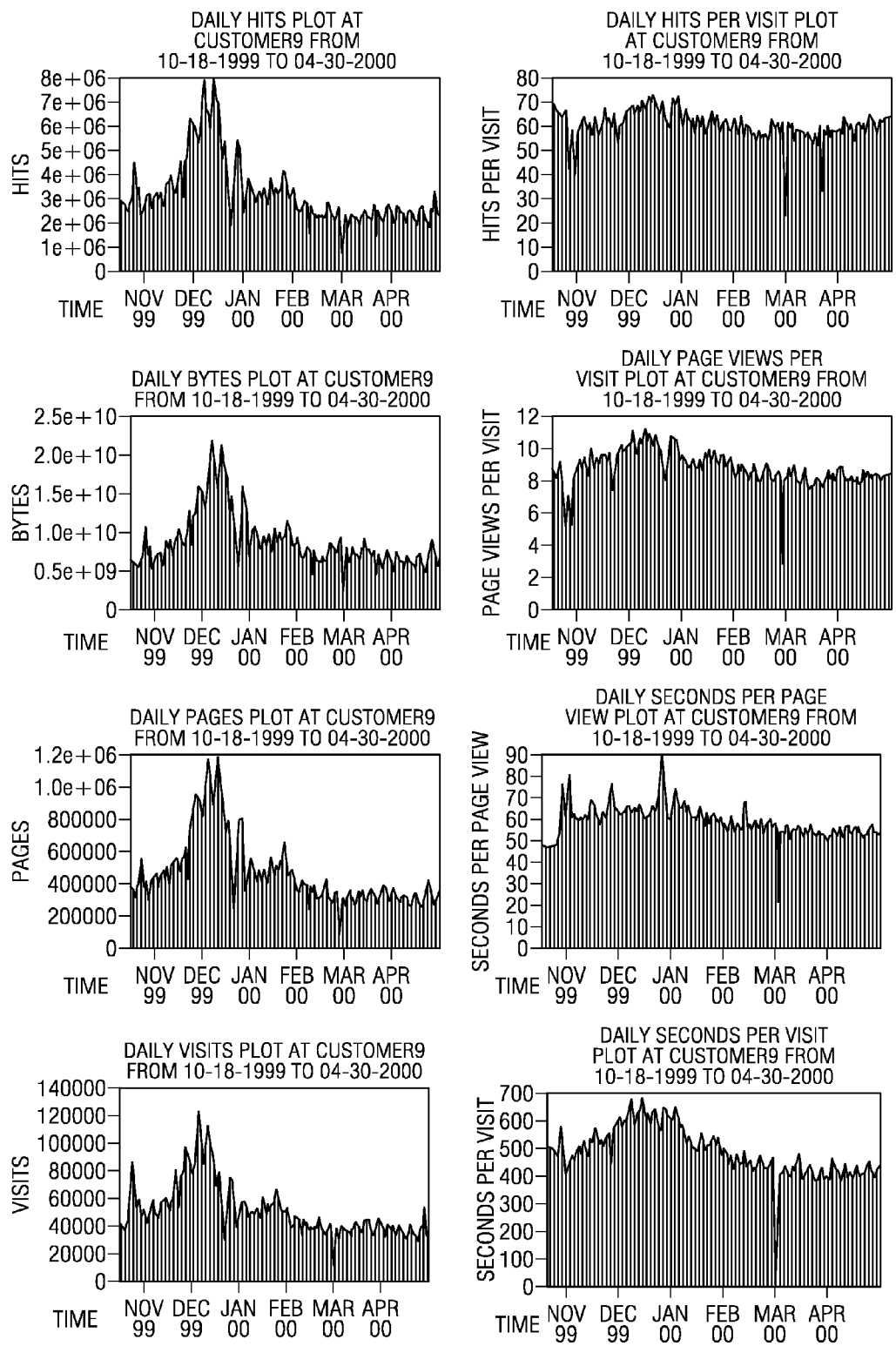

A similar pattern is prevalent in traffic data for different time scales, e.g., daily, weekly, monthly, and for other measures of request patterns, e.g., number of bytes, page views, visits, hits per visit, etc. FIGS. 5A-5C are exemplary diagrams of daily time-series plots of some of the exemplary commercial web sites in FIGS. 4A-4C for various measures. From FIGS. 5A-5C it can be seen that weekend effects of varying degrees for the web sites are present in these other measures. Certain web sites with weekend patterns also exhibit very consistent week-to-week behavior in which request measures do not change much from one week to the next.

In short, from the empirical data shown in FIGS. 4A-4C and 5A-5C, it is clear that many web sites experience patterns in their traffic. In addition to the above empirical characteristics, various statistical measures can be used to identify and examine some of the most complex characteristics of the user request patterns, at different time scales, in traffic for web sites. Such characteristics include, for example, the traffic variability and the peak to mean ratio, which are less visible and can only be computed from the time-series data.

Figure 6:
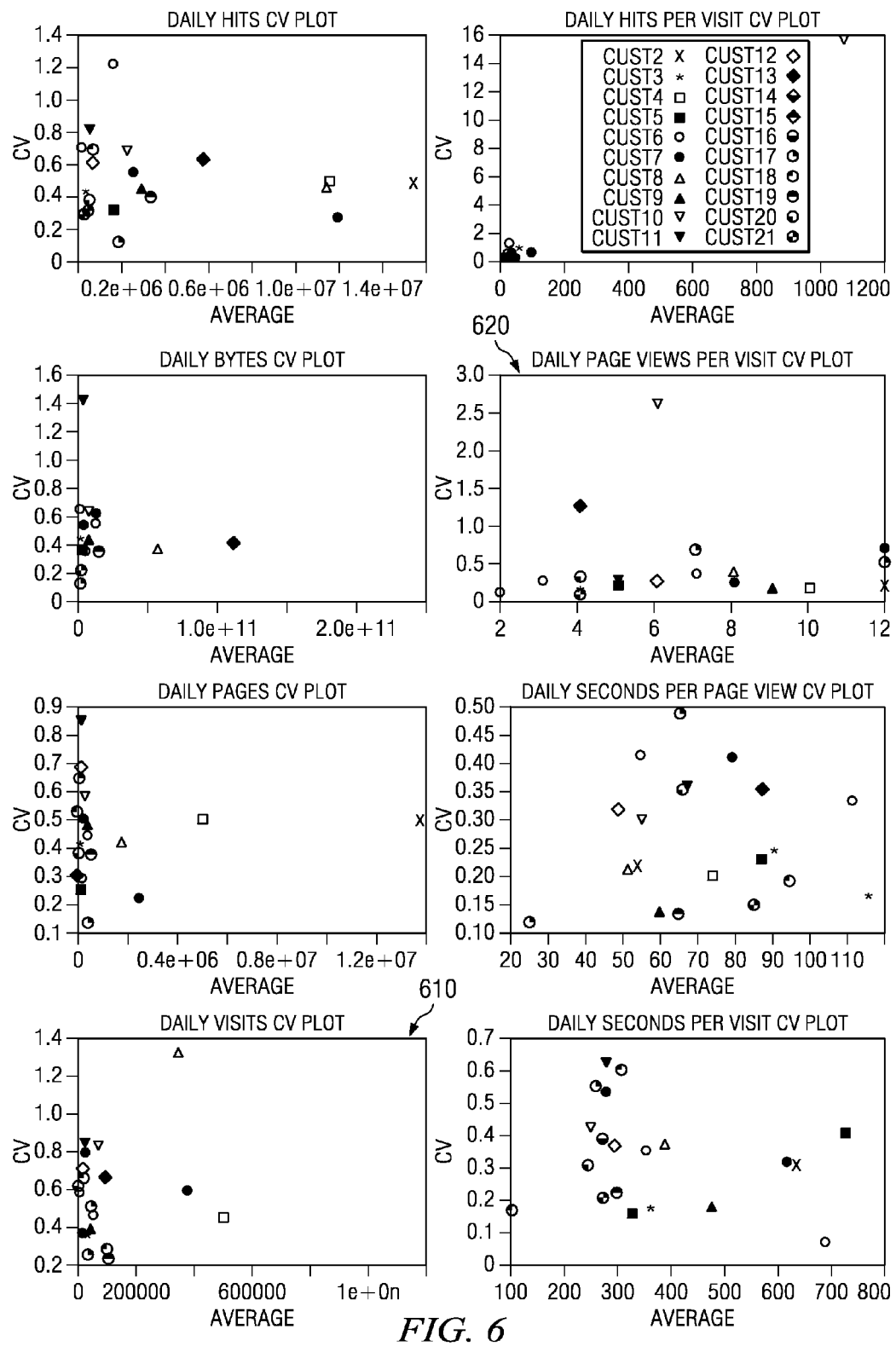
FIG. 6 is an exemplary diagram of daily coefficient of variation as a function of the daily average for different measures encountered at exemplary commercial web sites.

Some useful aspects of the variability of a request time series can be examined by the coefficient of variation (CV) of the overall request volume, i.e. the ratio of the standard deviation to the mean. For example, FIG. 6 is an exemplary diagram of the daily coefficient of variation of different measures as a function of the daily average for these measures that are encountered at exemplary commercial web sites. From FIG. 6 it can be seen that under some measures (e.g., daily visits plot 610), different sites exhibit quite different variabilities but similar daily averages while under some other measures (e.g., daily pageview per visit 620), different sites exhibit similar variabilities but different daily averages.

Figure 7:
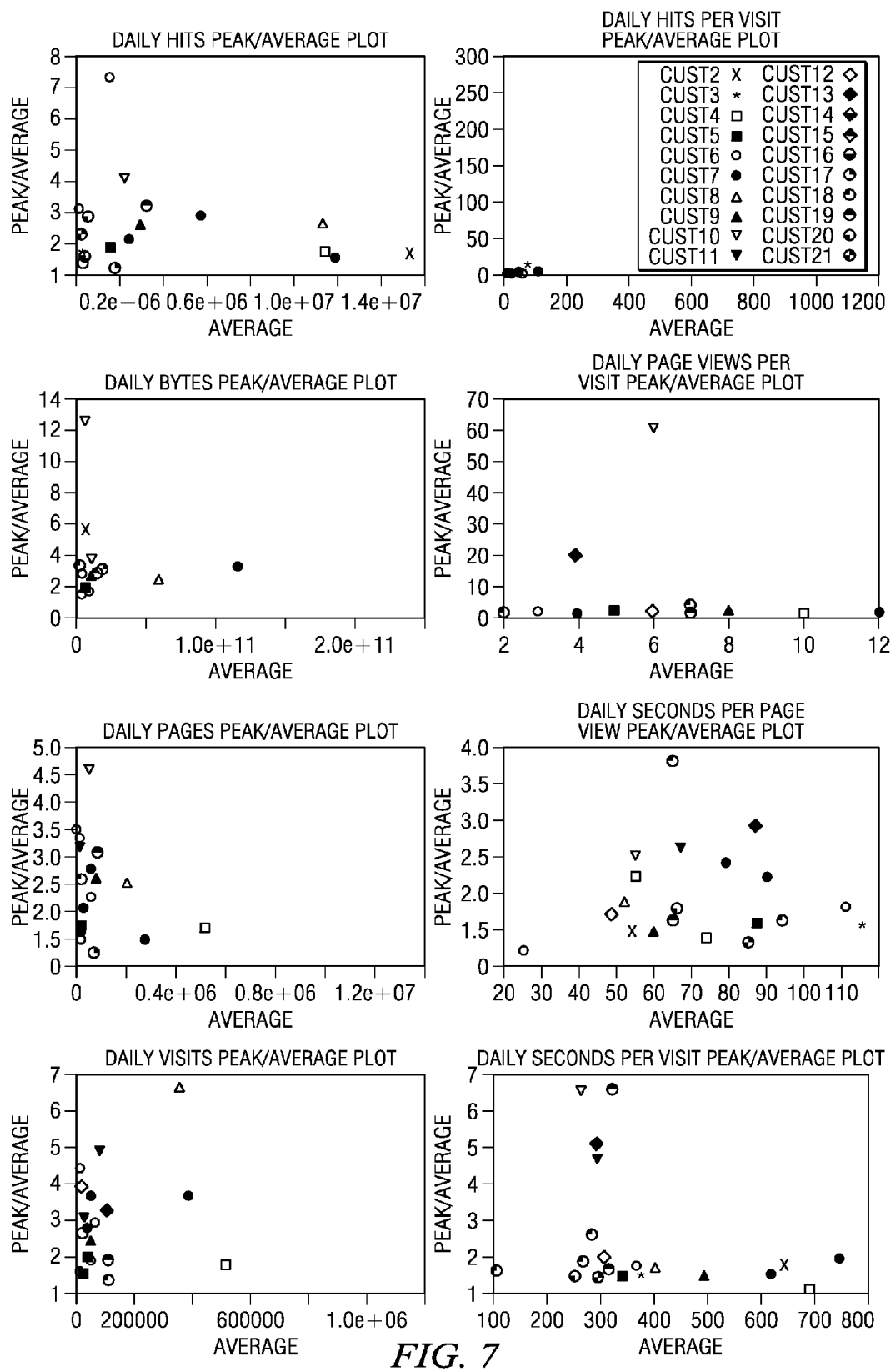
FIG. 7 is an exemplary diagram of daily peak to mean ratio as a function of the daily average for different measures encountered at exemplary commercial web sites.

One rough measure of burstiness in the request patterns is the ratio of the peak to mean request rate over a certain interval of time. This measure quantifies the peak request volume relative to the average request volume. FIG. 7 is an exemplary diagram of the daily peak to mean ratio for different measures as a function of the daily average for these measures that are encountered at exemplary commercial web sites. From FIG. 7 we observe similar behavior as in FIG. 6, namely different statistical properties of various measures can provide very different results.

Thus, while the results of the above empirical and statistical data analyses clearly illustrate that web sites experience patterns in their traffic, most of these results by themselves are not easily exploitable as the basis for our clustering, profiling and classification purposes. The present invention provides a mechanism for exploiting these traffic patterns to generate accurate models of the web sites for use in workload characterization, performance modeling, workload and performance forecasting, and capacity planning.

The present invention may be broken into three primary components: clustering, profiling and characterizing web sites. The first step of characterizing web sites is to generate clusters of web sites based on traffic data obtained for these web sites. Once the clusters are identified, each cluster, or class, is profiled to obtain a template for the class. Thereafter, as new traffic data is obtained for a web site, the traffic data may be compared against established templates for the classes in order to categorize the web site into one of the known classes. Alternatively, if the comparison results in the web site being sufficiently different from all of the known classes, a new class may be generated using the traffic data for the web site. This classification may then be used to perform functions such as workload characterization, performance modeling, workload and performance forecasting, and capacity planning, in order to best optimize the available resources for the web site.

As mentioned above, the first step in the operation of the present invention is to obtain traffic data from a plurality of web sites and cluster the web sites based on their traffic data. Clustering involves selecting a measure of traffic data to be used to cluster web sites and then identifying templates of the traffic data with regard to this selected measurement for each of the web sites. The templates are then clustered using a clustering algorithm which identifies groups of templates that are most similar to one another within a given tolerance. These groups, or classes, are the clusters of web sites that will be used to perform profiling and classification.

As mentioned above, the particular measure of traffic data used to perform the clustering must be selected prior to performing the clustering. Depending on the subset of measurement data used, different clustering results can be obtained. For example, web sites can be clustered according to the load/request patterns, user navigation patterns, site hypertext structures, etc. Each of these clusterings are different and can be considered orthogonal to one another. The particular clustering performed with the present invention may be selected based on the particular implementation of the present invention and the measures that are most important to a user of the present invention.

Figure 8:
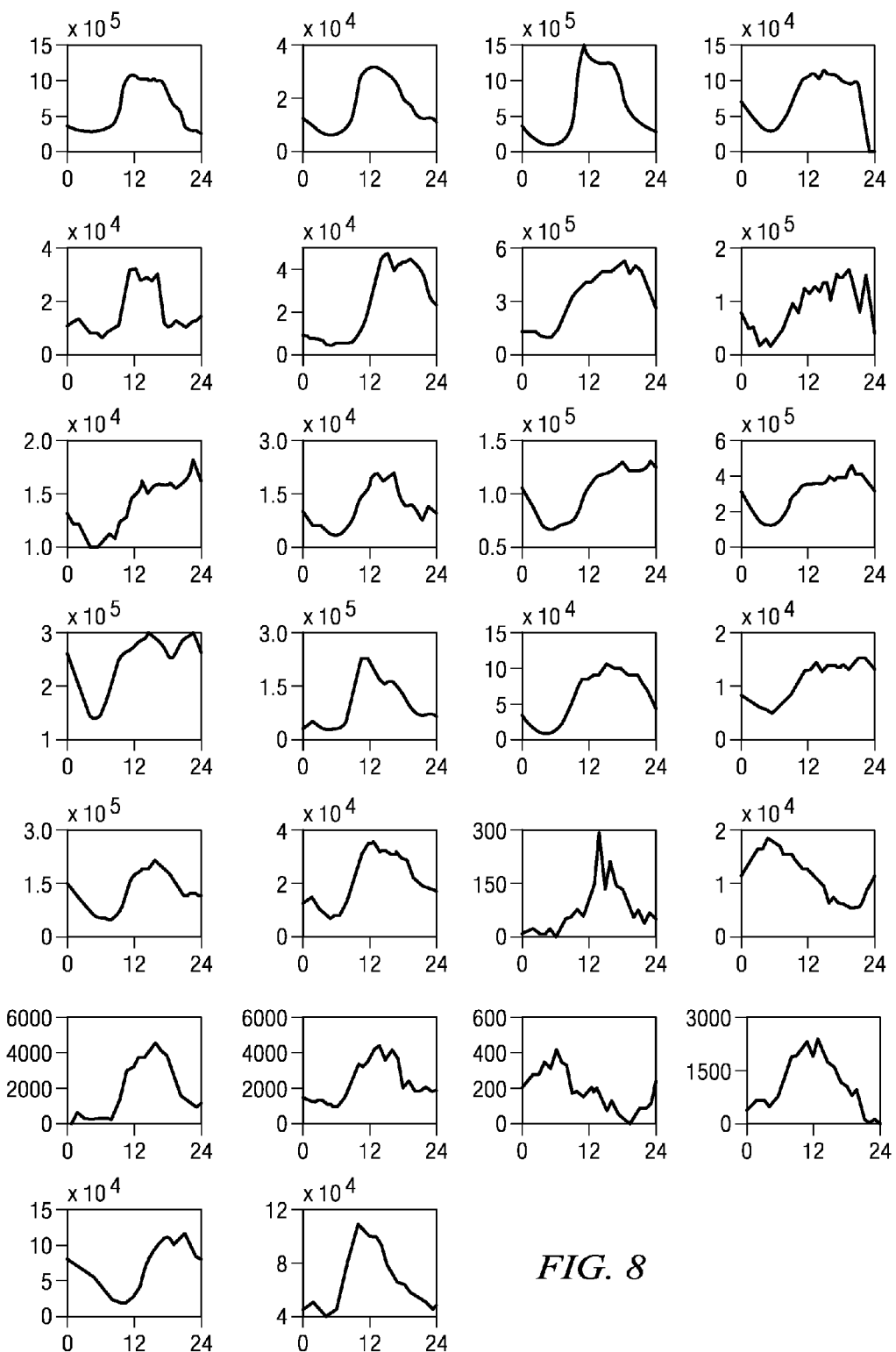
FIG. 8 is an exemplary diagram illustrating requests per hour over one day collected from exemplary commercial web sites for use in clustering the web sites.

In an exemplary embodiment of the present invention, the clustering is performed according to load patterns. For this purpose, the number of hits per hour is used as representative traffic data for characterizing the incoming request traffic patterns. FIG. 8 is an exemplary diagram illustrating requests per hour over one day collected from exemplary commercial web sites for use in clustering the web sites according to this exemplary embodiment.

Once the measurement of traffic data that is to be used to perform clustering is selected, the traffic data is then analyzed to identify templates, or typical shapes, in the traffic data with regard to this selected measurement. This template is essentially the time series data values for the selected measurement, or a function of these time series data values for the selected measurement.

In the exemplary embodiment of the present invention, the weighted average request pattern $\mu_i(h)$ representing the weighted mean of the hourly request pattern profile that occurs on a web server is utilized as a template for the web site. The weighted average request pattern $\mu_i(h)$ is obtained using the following equation:

$$\mu_i(h) = \sum_{d=1}^{D} (a_i(d)/D)(x_i(h, d)) \quad (1)$$

where $x_i(h,d)$ denotes the number of requests from the empirical data that the ith web server receives in the hth hour of day d, $h=0, 1, \ldots, n$, and where the weights $a_i(d)$ are the weight for day d of site i so that the workloads of different days are normalized to the same mean. Moreover, with the exemplary embodiment, the peak load regimes are determined to be the focus of the clustering since they have a more significant impact on web server performance. Thus, each weighted average request pattern is normalized by its maximum value and its peak hour traffic pattern is defined as follows:

$$\eta_i(h) = \{\mu_i(h)/m_i, \ \mu_i(h)/m_i > 0.5, \ \{0.5, \ \mu_i(h)/m_i \leq 0.5 \quad (2)$$

where $m_i = \max_h\{\mu_i(h)\}$.

A dissimilarity measure between the peak hour patterns is defined as:

$$\delta_{i,j} = \min_{h^\delta} \max_{h} \{|\eta_i(h) - \eta_j(h + h^\delta \bmod 24)|\} \quad (3)$$

where $h^\delta$ is used as the hourly shift needed when comparing two traffic patterns from different web servers with, for example, differences in time zones. This dissimilarity measure is the minimum of the maximum difference between the normalized weighted average request pattern for web site i and the normalized weighted average request pattern for web site j, shifted to compensate for the differences in time zones, if any. This dissimilarity measure is used to identify the normalized weighted average request patterns that are most similar to one another in order to cluster the patterns into classes of web sites.

In the exemplary embodiment, a complete linkage, or furthest neighbor, algorithm is used to cluster the normalized weighted average request patterns based on the dissimilarity measure. That is, in a first step, each pattern represents its own cluster and the distances between these patterns are defined by the dissimilarity measure given in equation 3 above. Then, the two patterns with the smallest distances are linked together. The distances between this new cluster and the other clusters (or individual patterns) are defined by the greatest distance between any two patterns in the respective clusters, i.e. by the furthest neighbors. As a result, the algorithm proceeds in subsequent steps to link more and more patterns together and to aggregate larger and larger clusters within a predetermined threshold.

Figure 9:
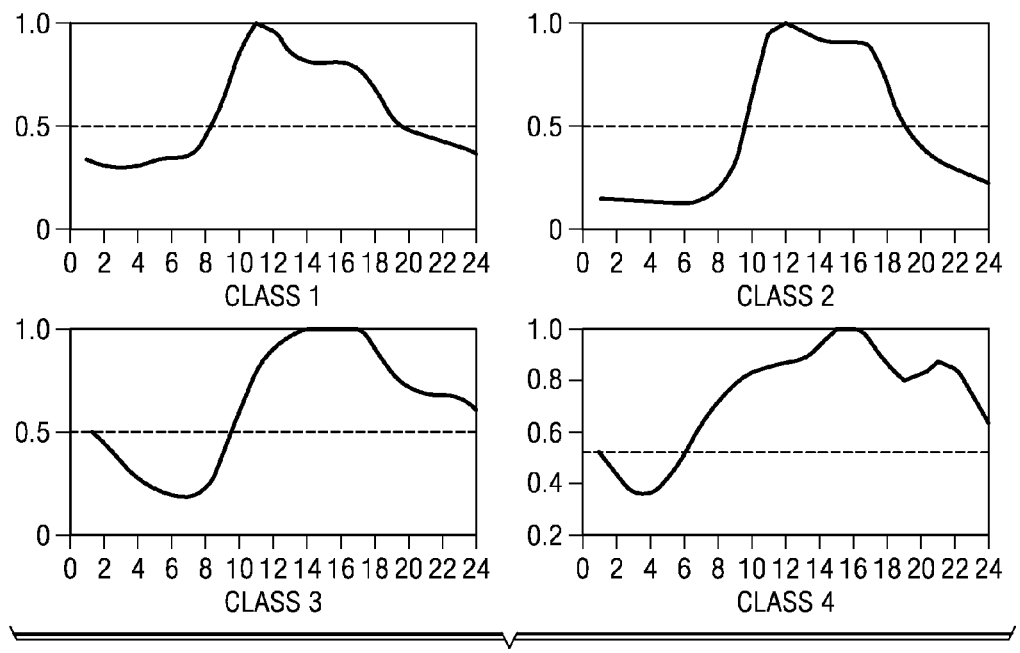
FIG. 9 is an exemplary diagram illustrating the patterns for four classes of request patterns into which the web sites of FIG. 8 are clustered.

In the exemplary embodiment, using a threshold of in the complete linkage algorithm, the request patterns shown in FIG. 8 are clustered into four distinct classes. FIG. 9 is an exemplary diagram illustrating the patterns for these four distinct classes of request patterns into which the web sites of FIG. 8 are clustered. From FIG. 9, the following observations about the various classes can be made. For class 1 patterns, the request traffic load increases to the peak level by noon and then goes down significantly in the afternoon. This suggests that users' interests for such web sites are more instantaneous, just like checking the weather report every day. The web sites are popular primarily in their local areas.

For class 2 patterns, the request traffic load increases to the peak level at noon and continues to remain high in the afternoon, but becomes very low in the evening. This suggests that users show their interests for these web sites primarily during working hours.

For class 3 patterns, the request traffic load increases to the peak level somewhat after noon and remains high throughout much of the afternoon. In the evening users continue to show some interest for these web sites.

For class 4 patterns, the request traffic load remains at a high level over a long period of time, from before noon well into the evening. This suggests that most of the users visit these web sites either during working hours or in their spare time and that the users are probably spread over the country and even the world.

By making such observations regarding the characteristics of web sites falling into each of these different classes, it is possible to predict the usage of a web site that is later classified into one of these classes. Thus, from such a prediction, various measures can be employed to handle the traffic that the web site should expect to experience.

Thus, according to a preferred embodiment of the present invention, clustering of web sites involves obtaining traffic data for a plurality of web sites, determining a measure of the traffic data to use as a basis for the clustering, identifying a pattern of the traffic data in accordance with the selected measure, defining a dissimilarity or similarity relationship for the traffic data, and then using a clustering algorithm to cluster the web sites based on this dissimilarity or similarity relationship. Once these clusters are identified, profiling of the clusters is performed to identify a template for the cluster that may be used with later classification of web sites.

Profiling involves first determining a metric upon which the traffic profiles will be based. In an exemplary embodiment, the weighted average load $\mu_i(h)$ is used to generate the profiles for the identified classes of web sites. In generating the profile for a class, a template for the class is identified that is defined as a request pattern that is most similar to all of the members of the class.

One approach to finding the template for a class is to simply average all the members of the class. While this may be done to obtain a template for the class, the result will typically not be a good choice for a template for the class since an outer member of the class may be far from this template but close to the templates of other classes. Another underlying consideration is that the templates defined for different classes should be far from each other. Therefore, the template for a class is defined so that it minimizes the maximum difference to all members in the class.

Assume that $G_k$ denotes the set of request patterns that belong to class k. Though similar in shape, the members, i.e. the web sites, within class k may actually be located in different time zones, or include any other sources of shifted behavior. To define the template, it is therefore necessary to first identify the correct shift biases $\{h_i^\delta, i \in G_k\}$ so that upon the shift, all members have the closest shapes. Such shift biases can be solved via the following mathematical expression:

$$\underset{\{h_i^\delta, h_j^\delta, i, j \in G_k\}}{\text{Min}} \left\{ \underset{\{i,j \in G_k\}}{\max} \underset{h}{\max} [|\eta_i(h + h_i^\delta \bmod 24) - \eta_j(h + h_j^\delta \bmod 24)|] \right\} \quad (4)$$

That is, upon the shift $\{h_i^\delta, i \in G_k\}$, the maximum difference between any two members of the class should be minimized. The particular shift, in an exemplary embodiment, may be identified using a shifting algorithm such as that set forth below. Other algorithms for identifying the particular shift may be used without departing from the spirit and scope of the present invention.

In an exemplary embodiment, the shift algorithm involves a first step in which the set $\{h_i^\delta, i \in G_k\}$ is to be arbitrary integers between 0 and 23 (possible shift in hours). Then for each $i \in G_k$ the shift value $h_i^\delta$ is updated so that:

$$H_i^\delta = \underset{h_i^\delta}{\text{argmin}} \left\{ \underset{\{i,j \in G_k\}}{\max} \underset{h}{\max} [|\eta_i(h + h_i^\delta \bmod 24) - \eta_j(h + h_j^\delta \bmod 24)|] \right\} \quad (5)$$

This step is then repeated until $\{(h_i^\delta, i \in G_k\}$ converges to a local optimum.

Thus, for each $i \in G_k, h_i^\delta$ is chosen so that upon the shift, member i is close to all other members of the class. The procedure is then repeated iteratively until no further improvement can be obtained.

Figure 10A:
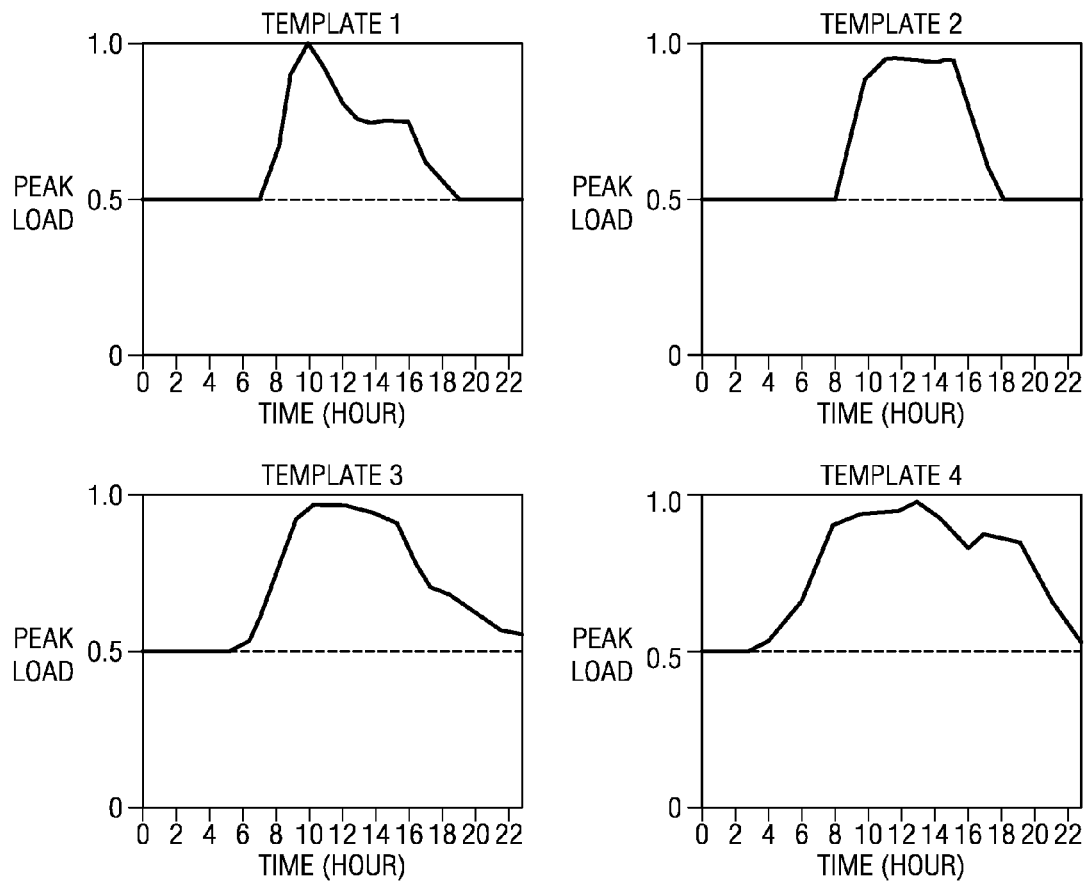
FIG. 10A is an exemplary diagram illustrating the four templates for the four classes of request patterns of FIG. 9.
Figure 10B:
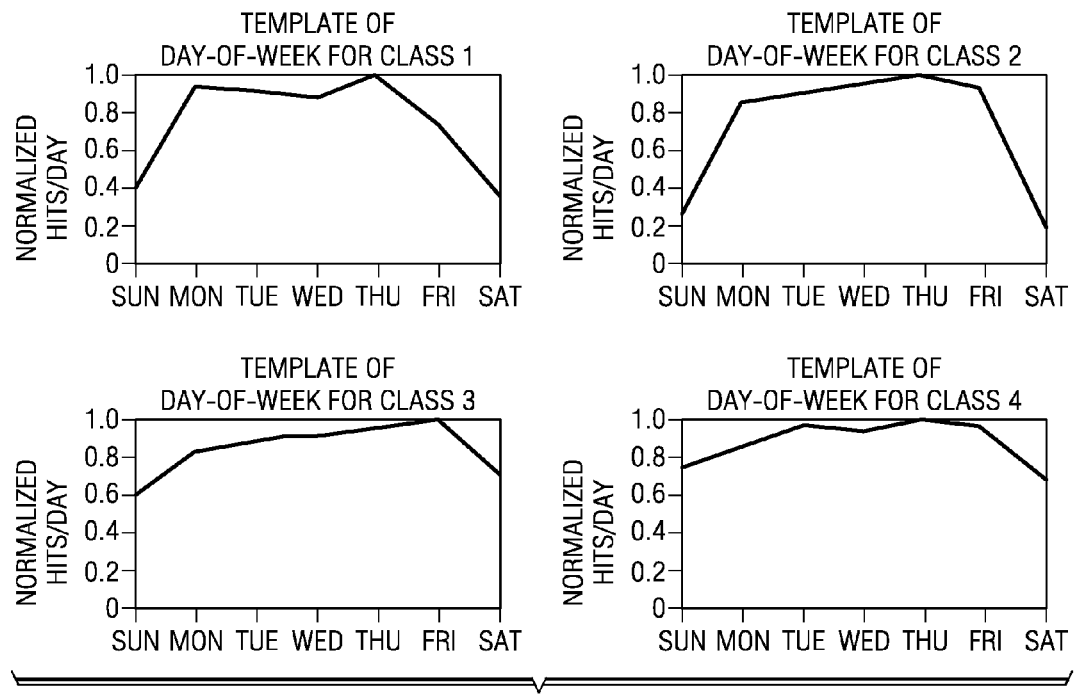
FIG. 10B is an exemplary diagram illustrating the day of the week patterns generated by applying the clustering and profiling of the present invention to the empirical data for the web sites of FIGS. 4A-4C.

Once the optimal shift biases $\{h_i^\delta, i \in G_k\}$ are identified, the template of class k is defined to be:

$$Tk(h) = \frac{1}{2} \{\max \{\eta_j(h + h_j^\delta \bmod 24)\} + \min \{\eta_j'(h + h_j^\delta \bmod 24)\}\} \quad (6)$$

for h=0, 1, . . . , 23. That is, the template is the most similar pattern to the patterns for all of the members of the class. FIG. 10A is an exemplary diagram illustrating the four templates for the four classes of request patterns of FIG. 9 generated using the clustering and profiling of the present invention. Applying this same clustering and profiling to empirical data, different templates may be generated for different traffic effects, such as day of the week, week of the month, month of the year, etc. For example, as shown in FIG. 10B, the day of the week patterns are shown which are generated by applying the clustering and profiling of the present invention to the empirical data for the web sites of FIGS. 4A-4C.

The templates for the classes generated using the clustering and profiling described above may be used to recognize incoming request patterns. First, the templates are used to recognize the existing samples and to check if the results of this recognition are consistent with the clustering. Thereafter, the request pattern is matched to a class of requests based on the template. From this matching, certain characteristics of the web site traffic may be discerned based on the characteristics of the other web sites that are part of the class.

Preferably, in order to perform the classification, equations 1 and 2 above are used to compute the normalized peak hour request pattern for newly collected data. Thereafter, equation three is preferably used to compute the distance measures between the incoming request pattern data and the data for the four templates. Based on these distance measures, a closest matching template may be identified and the incoming request pattern classified into the corresponding class.

Since the predetermined templates may not cover all possible request patterns, a new type of request pattern or an extraordinary request pattern may be far from all of the predetermined templates, i.e. the minimum distance is greater than a threshold amount. In such cases, the new request pattern may be added as a new template for a new class of request patterns.

By clustering, profiling and classifying web sites according to the present invention, characteristics about web site traffic may be identified based on the web sites falling into the same class. This classification may be used with many different types of applications including traffic prediction, capacity planning, hot-spot detection, dynamic off-loading, web site co-location, and the like.

With regard to traffic prediction, one key issue in capacity planning is the prediction of workload behavior. The prediction mechanism needs to capture the characteristics of long-term trends, periodicity, dependency and variability. It is difficult to use a single technique to capture all of these factors. Therefore, a more accurate approach would be to use a hybrid technique pertaining to both macro and micro level statistics. While long-term trends may be measured using linear regression methods, the periodicity at different scales (e.g., monthly, weekly, daily, etc.) may be handled using the clustering and profiling technique of the present invention.

The clustering approach of the present invention can greatly simplify the capacity planning task. With the present invention, the templates (or profiles) of different clusters (or classes) may be used to analyze the capacity demand for each individual profile, the impact of the scaling factor, and the mixtures of the profiles for servers in a web server farm, cluster, or the like. When a new customer comes along, the classification technique of the present invention may be used to determine the cluster to which the new customer's traffic belongs so as to adjust the capacity requirements, if necessary. In the same way, short-term capacity planning decisions may also be easily adjusted if some web sites cause the clusters to change because of special events, web site redesign, etc.

With special events, e.g., holiday sales for e-commerce web sites, some web sites can be heavily loaded and thus, require certain additional operations in order to fulfill the needed quality of service. Examples of such operations include offloading and adding new resources. Such special events represent "hot-spots." With hot-spot detection, the goal is to detect the hot-spots so that appropriate mechanisms for handling the hot-spots may be triggered. With the profiling approach of the present invention, these hot-spots can be detected once it is observed that the current workload is deviating significantly from typical behavior which is described by the templates.

As mentioned above, sometimes dynamic offloading operations are needed in order to alleviate server overload, such as when a hot-spot is encountered. One way to achieve this dynamic offloading is to create new (or use different) versions of the web pages with references of offloadable objects (such as images) to the server onto which some of the extra load can be offloaded (such as Akamai servers). With proper use of the templates of the present invention, it is easy to determine what is the threshold beyond which traffic should be offloaded. Moreover, the offloading scheme may be started before the server is saturated in order to account for the lag time of the offloading scheme. This new threshold, i.e. the threshold accounting for lag time, may be determined from the template together with the lag time.

With web site co-location, the goal is to share resources among multiple web sits so that peak load conditions for any given web site can be handled by borrowing resources from the other entities. An important problem in this paradigm concerns the clustering of the web sites for resource sharing. Based on the observed traffic templates, one can easily identify the shapes of the peak regimes for the different sites, as well as the different traffic peaks and valleys at different times and at different geographical time zones. Optimization tools may then be used to achieve load balancing across a number of web sites in order to obtain the smoothest possible overall peak loads. The optimization problem can be considered as a general bin packing problem where the items are the templates. This also can be formulated as an integer programming problem.

It should be noted that while the above embodiments of the present invention have been described with regard to request patterns, the present invention is not limited to such. Rather, any measurement data for web sites may be used to perform the clustering, profiling and classification of the present invention. For example, the present invention may operate on server utilization data, bandwidth consumption data, or the like.

Figure 11:
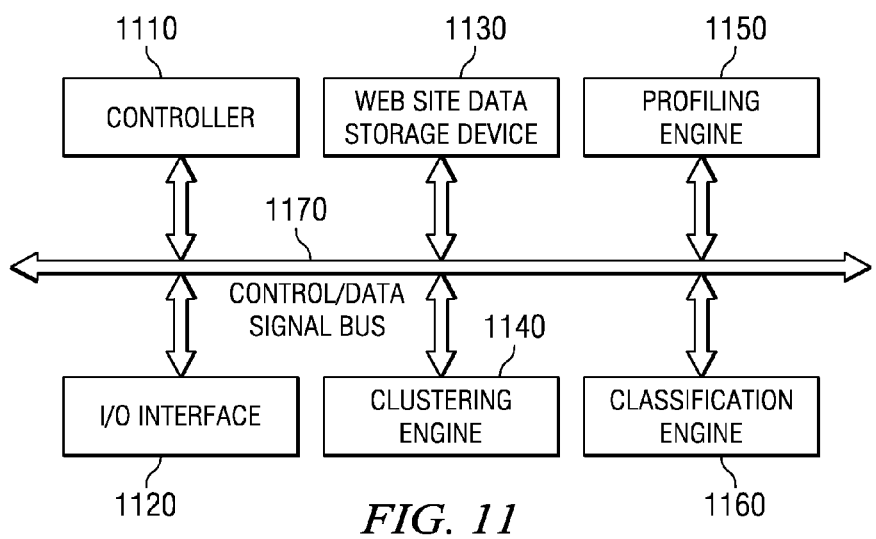
FIG. 11 is an exemplary block diagram of a web site classification device according to the present invention.

FIG. 11 is an exemplary block diagram of a web site classification device according to the present invention. The elements shown in FIG. 11 may be implemented in hardware, software, or any combination of hardware and software without departing from the spirit and scope of the present invention. In a preferred embodiment, the elements of the web site classification device are implemented as software instructions executed by one or more processors.

As shown in FIG. 11, the web site classification device includes a controller 1110, an input/output interface 1120, a web site data storage device 1130, a clustering engine 1140, a profiling engine 1150, and a classification engine 1160. The elements 1110-1160 are in communication with one another via the control/data signal bus 1170.

The controller 1110 controls the overall operation of the web site classification device and orchestrates the operation of the other elements 1120-1160.

The controller 1110 receives web site traffic data from web sites via the input/output interface 1120 and stores this web site traffic data in the web site data storage device 1130. The controller 1110 then instructs the clustering engine 1140 to cluster the web sites for which data is stored in the web site data storage device 1130.

Once the clustering is performed, and the web sites are assigned to particular classes of web sites, the controller 1110 instructs the profiling engine 1150 to generate a template, or profile, for each of the classes. The clustering and profiling may be performed on a periodic basis such that the clusters maintained by the web site classification device, and their corresponding templates or profiles, are updated as new web site traffic data becomes available. Alternatively, the clustering and profiling may be updated each time traffic data is received from a new web site so as to include this new web site into the clusters and templates maintained by the web site classification device.

When a traffic data is received from a new web site, the traffic data is compared to the templates for the various classes maintained by the web site classification device. From this comparison, a determination may be made as to whether the traffic data for the new web site fits the template for one of the classes or is sufficiently dissimilar to all of the templates for the classes so as to warrant the creation of a new class and template based on the traffic data for the new web site. From this classification of the traffic data for the new web site, the new web site is assigned to a particular class of web sites or is used to generate its own class of web sites. As noted above, this classification may then be used by different processes to perform resource management functions such as workload characterization, performance modeling, workload and performance forecasting, capacity planning, and the like.

Figure 12:
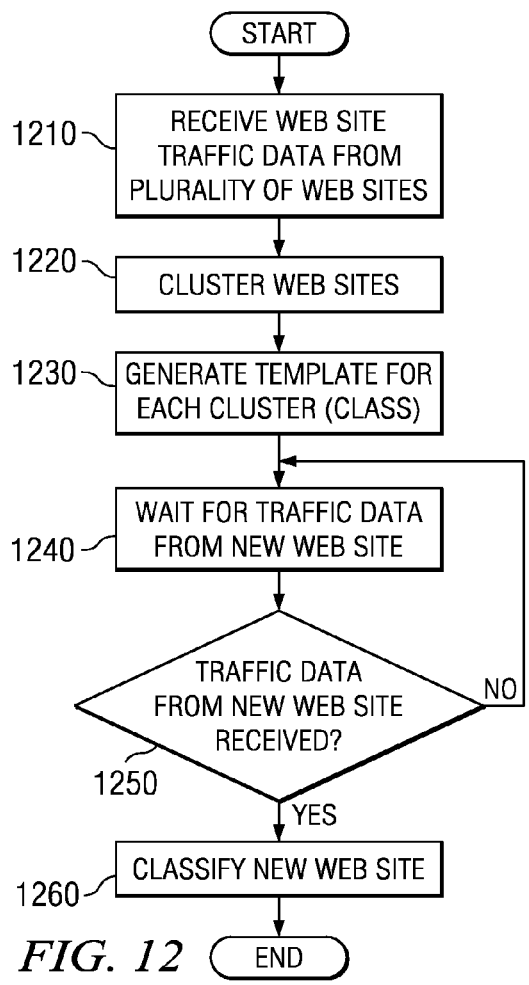
FIG. 12 is a flowchart outlining an exemplary operation of the present invention.

FIG. 12 is a flowchart outlining an exemplary operation of the present invention. As shown in FIG. 12, the operation of the present invention starts with receiving web site traffic data from a plurality of web sites (block 1210). The web site traffic data is then clustered using the clustering technique discussed above (block 1220). For each cluster, or class, a template or profile is generated (block 1230).

The operation then waits for traffic data from a new web site (block 1240). A determination is then made as to whether traffic data for a new web site is received (block 1250). If not, the operation returns to block 1240 and continues to wait for traffic data from a new web site. If traffic data for a new web site is received, the traffic data for the new web site is classified based on the existing classes of web sites (block 1260). The operation then ends.

Figure 13:
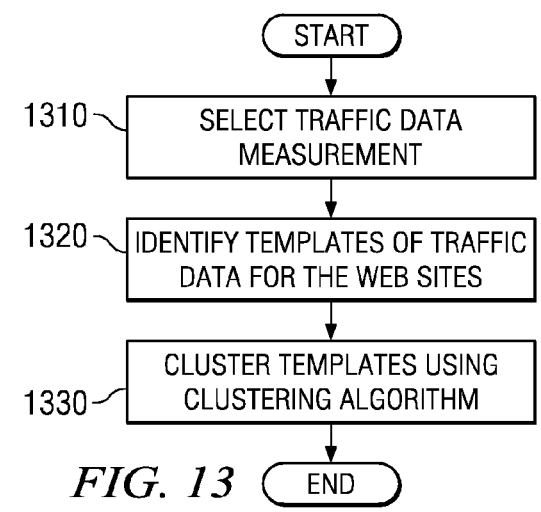
FIG. 13 is a flowchart outlining an exemplary operation of the present invention for clustering web sites.

FIG. 13 is a flowchart outlining an exemplary operation of the present invention for clustering web sites. As shown in FIG. 13, the clustering operation of the present invention starts by selecting a traffic data measurement by which to perform the clustering (block 1310). Templates of the traffic data for the web sites with regard to the selected traffic data measurement are then identified (block 1320). The templates are then clustered using a clustering algorithm (block 1330).

Figure 14:
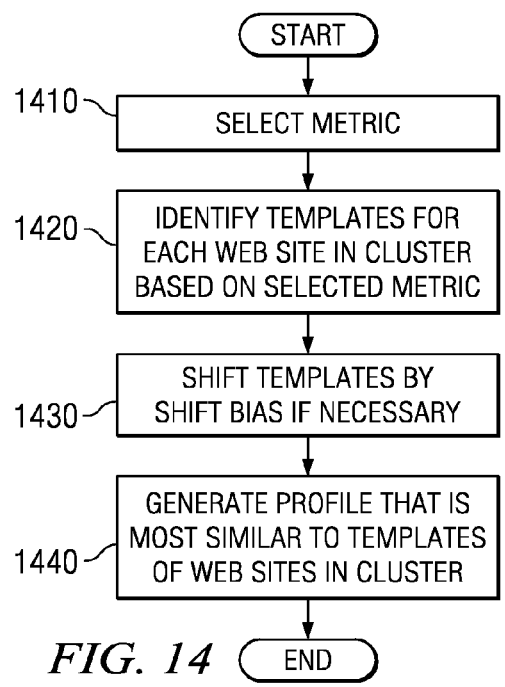
FIG. 14 is a flowchart outlining an exemplary operation of the present invention for clustering web sites.

FIG. 14 is a flowchart outlining an exemplary operation of the present invention for profiling web sites. As shown in FIG.

14, the operation starts with determining a metric upon which the traffic profiles will be based (block 1410). Templates for each web site's traffic data in the class are generated based on this selected metric (block 1420). The templates are then shifted by a shift bias amount, if necessary, to compensate for factors such as different time zones (block 1430). A profile is then generated by selecting a profile that is most similar to all of the templates for the web sites in the class (block 1440). This operation may be performed for each class of web sites.

Figure 15:
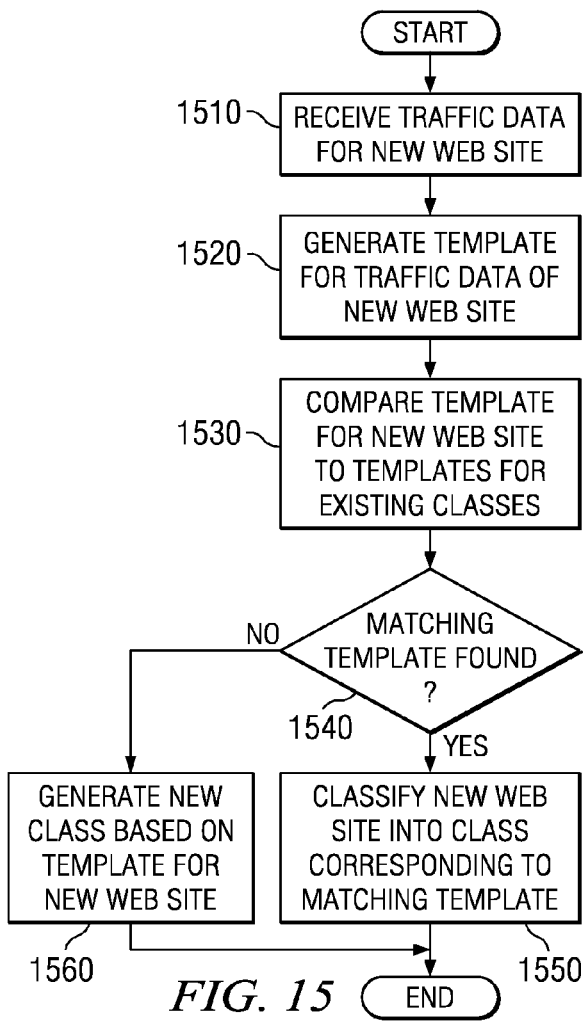
FIG. 15 is a flowchart outlining an exemplary operation of the present invention for classifying web sites.

FIG. 15 is a flowchart outlining an exemplary operation of the present invention for classifying web sites. As shown in FIG. 15, the operation for classifying web sites starts with the receipt of traffic data for a new web site (block 1510). A template for the traffic data for the new web site is generated (block 1520) and compared to the templates for the existing classes of web sites (block 1530). A determination is made as to whether a matching template is identified (block 1540). If so, the web site is classified into the class associated with the matching template (block 1550). If not, a new class is generated using the traffic data for the new web site as a basis for generating a template for the new class (block 1560). The operation then ends.

Thus, the present invention provides mechanisms for the clustering, profiling and classification of web sites based on their traffic data. With the present invention, similarities between web sites with regard to their experienced traffic may be identified for use in predicting and planning for workloads that are most likely to be experienced in the future. Thus, the present invention provides a tool through which resource management for web servers may be performed with regard to the web sites they host.

The clustering, profiling and classification of web sites in the manner discussed above may be applied to resource allocation to obtain an optimized resource allocation for a group of web sites. With the present invention, once the templates for web sites in a group of webs sites are obtained through the mechanisms discussed above, these templates may be used to determine which web sites in the group are candidates for co-location and when traffic should be offloaded to other web servers. These functions of co-location and offloading may further be combined to obtain greater optimization of the resource allocation to provide a required Quality of Service (QoS) to client devices that access those web sites.

With co-location, the goal is to co-locate web sites which have peaks and troughs in traffic at different times based on the templates associated with the web sites. That is, the goal is to have a single server (or a suite of servers) that handles traffic for two or more web sites wherein the templates compliment each other to obtain a fairly consistent resource utilization or at least to provide the required Quality of Service at all time periods.

There are several variants of the co-location problem can be solved. One example is that the web server must have a given capacity for traffic. This is the typical case in which a web server provider wants to keep a certain capacity at all time epochs to handle any non-normal traffic volumes that may be experienced.

This type of co-location problem is solved by the present invention by first determining the template of the traffic for each web site under consideration for co-location. This template is determined from the traffic logs of the web site. The template may be obtained through the clustering, profiling, and/or classification mechanisms described previously.

Once the templates for each of the web sites under consideration are obtained, an integer programming (IP) problem is formulated. This integer programming problem has decision variables that are the assignment of the web sites to web servers. The constraints of the integer programming problem are the capacity limitation for any server at any time epochs.

The objective function is any increasing function of the minimum distances between the server capacity and the peak load at different servers.

After the integer programming problem is formulated, it is solved using optimal or approximate algorithms. Standard methods and algorithms to solve integer programming problems include branch and bound, cutting plane algorithms, LP relaxation methods, and the like.

For example, assume that there are I web sites that must be served with a total of J servers, each having a capacity $C_j$, where j=1 to J. Suppose that the traffic of Web site i can be characterized by template $T_i(t)$, where i=1 to I. The binary decision variables are $x_{ij}$, where i=1 to I and j=1 to J, such that $x_{ij}=1$ if site i is assigned to server j, otherwise $x_{ij}=0$.

The co-location problem can then be formulated as the following binary integer programming problem, where $\beta$ is the target utilization:

$$\min \beta$$

$$s.t. \sum_{i=1}^{I} x_{ij} T_i(t) \le \beta C_j, \ j=1, \ldots, J, t \ge 0.$$

$$\sum_{j=1}^{J} x_{ij} = 1, \ i=1, \ldots, I.$$

$$\beta \le 1$$

where $x_{ij}$'s are binary integers.

In the above approach, the objective function can also be another load balancing criteria, such as the empirical variances of the loads, for example. Some slackness in the constraints may also be introduced such that the peak loads are below the server capacities by a certain amount. In this way, the mean response time of the requests will be upper bounded.

Another example of the co-location problem is to minimize the total cost of the web servers, given that the different web servicers have different costs and the cost is incurred if at least one web site is assigned to it. In this case, the co-location problem may be solved in the following manner.

As with the previous variation of the co-location problem, the first step of the process is to identify the template of the traffic for each web site under consideration for co-location. Once the templates are identified, the integer programming problem is formulated in which the decision variables are again the assignment of the web sites to the web servers. The constraints are the capacity limitation for any server at any time epochs. The objective function, however, is the sum of the costs of all web servers to which at least one web site is assigned. This integer programming problem is solved using optimal or approximate algorithms.

As an example of this variation of the co-location problem, consider the case described previously but where the objective is to minimize the total cost of the web servers given that using web server j will cost $P_j$, where j=1 to J. In such a case, the objective function of the previous example is replaced with the following:

$$\min \sum_{j=1}^{J} P_j 1\left( \sum_{i=1}^{I} x_{ij} > 0 \right),$$

where the function 1(a) equals 1 if statement a is true, and 0 otherwise. Thus, the binary integer programming problem is formulated as follows:

$$\min \sum_{j=1}^{J} P_j 1\left(\sum_{i=1}^{I} x_{ij} > 0\right),$$

$$s.t. \sum_{i=1}^{I} x_{ij} T_i(t) \leq \beta C_j, \; j = 1, \ldots, J, t \geq 0.$$

$$\sum_{j=1}^{J} x_{ij} = 1, \; i = 1, \ldots, I.$$

where $x_{ij}$'s are binary integers.

A simpler version of the above problem is that the server capacities are identical and so are the server costs. In this case, the problem reduces to a two dimensional bin packing problem where the bins are the servers and the items are the traffic templates. Thus, the problem can be solved in the following manner.

First, as with all of the co-location problems, the templates for the web sites under consideration for co-location are identified. Then the bin packing problem is formulated with the objective being to minimize the number of bins used. Thereafter, the two dimensional bin packing problem is solved using fast or approximate algorithms. Such fast and approximate algorithms are known in the art and more information regarding such fast and approximate algorithms may be found, for example, in E. G. Coffman, Jr. et al., "Approximation Algorithms for Bin-Packing—An Updated Survey," Algorithm Design for Computer System Design, edited by Ausiello, Lucertini, and Serafini, Springer-Verlag, 1984 and David S. Johnson, "Fast Algorithms for Bin Packing," Journal of Computer and System Sciences 8, pages 272-314, 1974.

Figure 16:
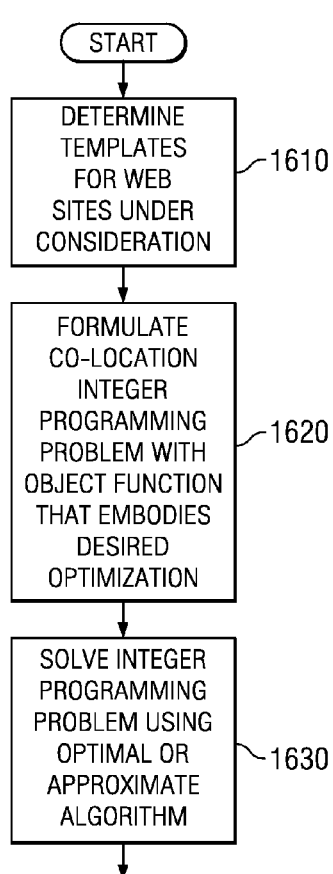
FIG. 16 is a flowchart outlining an exemplary operation of the present invention for determining which web sites are candidates for co-location.

Thus, as shown in FIG. 16, with each variance of the co-location problem, the operation for determining the assignment of web sites to web servers, and thus, the co-location of web sites, starts by identifying the templates for the web sites being considered (block 1610). The co-location problem is then formulated as an integer programming problem with an objective function that embodies the desired optimization for allocation of the web sites (block 1620). The integer programming problem is formulated such that the decision variables are the assignment of the web sites to web servers and the constraints are the capacity limitation for any server at any time epoch. Once the integer programming problem is formulated, the integer programming problem is solved with optimal or approximate algorithms (block 1630). As noted above, the integer programming problem may be reduced to a bin packing problem when certain characteristics, such as capacity and cost, are considered identical for all servers.

As mentioned previously, the present invention may further be applied to offloading of traffic to other web sites. The offloading mechanism involves redirecting part of the incoming requests to backup or other less-loaded servers when a web site becomes heavily loaded and thus, requires certain additional service capacity in order to fulfill the needed quality of service. When the offloading mechanism is turned on, requests can be redirected by, for example, using HTTP redirection response code 301 or 302 to have the client's browser retry the request at a different web server or placing a load-balancing device, like IBM Network Dispatcher or Cisco Global Director, in front of the web servers and using the ability of those devices to send requests to different servers at different times under control of the present invention.

The key question concerns how to proactively detect or predict such heavily loaded situation thus triggering the offload mechanism at the right time. The offloading according to the present invention will be described with reference to FIG. 17 which illustrates a template for a web site with thresholds for offloading according to the present invention also depicted.

Figure 17:
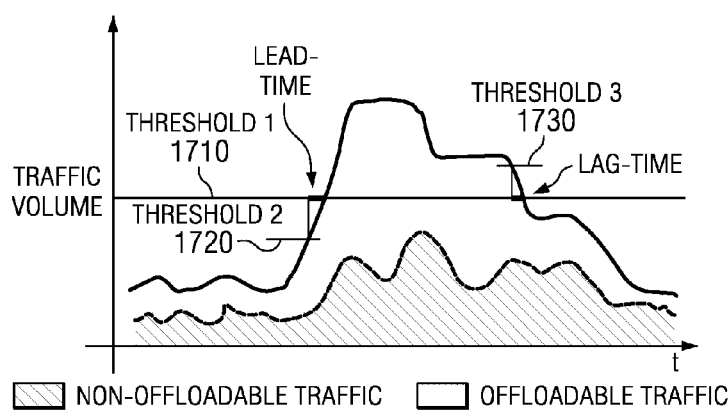
FIG. 17 is a diagram illustrating a template for a web site with thresholds for offloading according to the present invention illustrated.

With offloading according to the present invention, the templates of traffic for each web site under consideration are determined from the traffic logs of the web sites in the manner previously described. FIG. 17 illustrates one such template for a web site. In a preferred embodiment, the templates are determined in terms of the number of requests per unit of time.

A first threshold 1710 is calculated with respect to the traffic intensity, above which a fraction of the traffic should be offloaded from the home web server in order to guarantee a Quality of Service (QoS) criteria. This threshold 1710 is determined based on the marginal distribution of the total traffic and the amount of traffic that is offloadable. More precisely, if $\theta_1$ is the threshold 1710, $\alpha$ is a proportion of offloadable traffic, $E[S_o]$ and $E[S_{no}]$ are the expected service requirement per offloadable and non-offloadable request, C is the capacity of the bottleneck resource under consideration, and $\beta$ is the target resource utilization which is determined by the QoS that the system needs to guarantee, then the first threshold 1710 may be determined by:

$$\theta_1 = \beta C / (\alpha E[S_o] + (1-\alpha) E[S_{no}])$$

Once the first threshold 1710 is computed in the manner described above, a second threshold 1720 is computed with respect to the traffic intensities in the transition regime from low to high. A third threshold 1730 is computed with respect to the traffic intensities in the transition regime from high to medium. The calculation of the second threshold 1720 takes into account the lead time to meet the threshold 1710 based on the reaction time of the dynamic offloading mechanisms and the statistical pattern of the traffic. Similarly, the calculation of the third threshold 1730 takes into account the lag time based on the reaction time of the dynamic offloading mechanisms and the statistical pattern of the traffic. Thus, the second threshold 1720 may be calculated by subtracting a lead time from threshold 1710 and the third threshold 1730 may be calculated by adding a lag time to the threshold 1710.

Once the templates are identified and the thresholds are calculated, online transitions from low to high regimes and from high to medium regimes are detected. The detection can be carried out using several statistical techniques. One such technique is change-point detection which consists of computing the marginal distributions of the incoming traffic. With this technique, the deviation of this marginal distribution is detected. More information regarding change-point detection may be found, for example, in Carlstein et al., "Change-Point Problems," IMS Lecture Notes—Monograph Series, vol. 23, 1994. A simpler way to detect the transitions is to compute the moving average of the traffic intensity. This moving average may be taken at quite coarse time scales on the order of minutes or tens of minutes. For example, one way of computing the moving average is to compute the weighted sum of the previous estimates together with a number of recent observations. For example:

$$\text{Estimate}_{new} = \gamma_1 T(t) + \ldots + \gamma_k T(t-k+1) + (1-\gamma_1-\ldots-\gamma_k) \text{Estimate}_{add}$$

where $\gamma_1 \ldots \gamma_k$ are the nonnegative weights. The requirement is that $\gamma_1 + \ldots + \gamma_k \leq 1$.

With the above approach, the offloading mechanism is turned on when the traffic intensity exceeds threshold 1720 and is turned off when the traffic intensity falls below threshold 1730.

Figure 18:
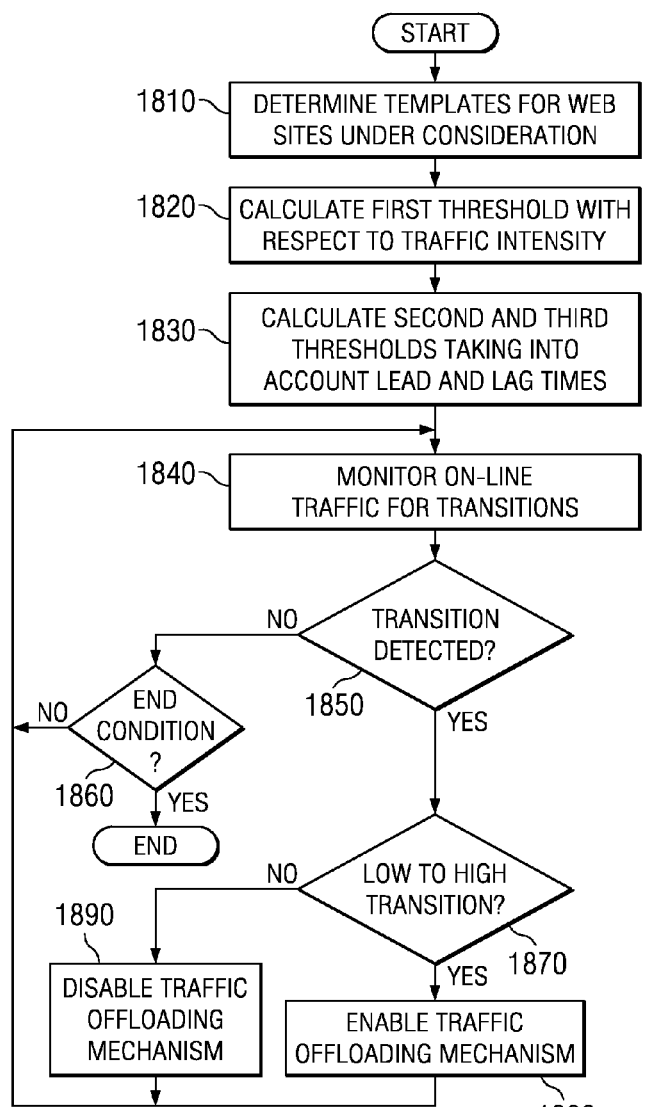
FIG. 18 is a flowchart outlining an exemplary operation of the present invention for offloading traffic according to the present invention.

FIG. 18 is a flowchart outlining an exemplary operation of the present invention for offloading traffic according to the present invention. A shown in FIG. 18, the operation starts with identifying the templates for each web site under consideration (block 1810). The first threshold is computed with respect to traffic intensity based on the marginal distribution of the total traffic and the amount of traffic that is offloadable (block 1820). The second and third thresholds are then calculated based on the first threshold and the lead and lag times of the offload mechanism (block 1830).

Thereafter, the on-line traffic is monitored to determine if there are transitions from low to high regimes and high to medium regimes (block 1840). A determination is made as to whether a transition is detected (block 1850). If not, the operation determines if an end condition occurs, e.g., offloading is disabled (1860). If so, the operation ends. Otherwise, the operation returns to block 1840 and continues to monitor for transitions.

If a transition is detected, a determination is made as to whether it is a low to high transition (block 1870). If so, the traffic offloading mechanism is enabled and traffic is offloaded to another server (block 1880). If the transition is not low to high, then the transition is a high to medium transition and the offloading mechanism is disabled (block 1890).

Thus, as described above, the present invention of clustering, profiling and classifying web sites based on their traffic logs to thereby generate templates of the traffic for the web sites, may be applied to resource allocation mechanisms such as co-location and offloading. As mentioned previously, the present invention may further be applied to a combination of co-location and offloading. The combination problem of co-location and offloading will often arise in a situation where a web server hosts several web sites and when the load of the server exceeds its capacity, it must offload the offloadable traffic to other web servers. With such a situation, present invention may be implemented in the following manner to perform offloading of co-located web sites.

As with all of the previous mechanisms, the templates for each of the web sites under consideration must first be determined. A mathematical programming problem is then formulated in which the decision variables are the assignment of fractions of traffic from web sites to web servers. The constraints are the capacity limitation for any server at any time epochs. The objective function is the sum of the costs of all web servers to which at least one web site is assigned.

As an example, assume similar conditions as described in the previous co-location problem. Note that the decision variables $x_{ij}$'s no longer need to be binary integers. Instead, $x_{ij}$ denotes the fraction of traffic from web site i that can be assigned to server j, where i=1 to I and j=1 to J. Thus, $0 <= x_{ij} <= 1$, and the mathematical programming problem is formulated as follows:

$$\min \sum_{j=1}^{J} P_j 1\left(\sum_{i=1}^{I} x_{ij} > 0\right),$$

$$\text{s.t.} \sum_{i=1}^{I} x_{ij} T_i(t) \leq \beta C_j, j = 1, \ldots, J, t \geq 0.$$

$$\sum_{j=1}^{J} x_{ij} = 1, i = 1, \ldots, I.$$

$$0 <= x_{ij} <= 1, i = 1, \ldots, I \text{ and } j = 1, \ldots, J.$$

The mathematical programming problem, once formulated, is solved using optimal or approximation algorithms. The mathematical programming problem has linear constraints and becomes a linear programming problem if the server costs are assumed to be proportional to their utilization.

For each web site, a web server is designated as its home server among those to which some portion of the traffic is assigned. The fraction of the traffic assigned to the home server will also be referred to as the threshold 1 of the web site at it's home server.

For each web site, a threshold 2 is computed with respect to the traffic intensities in the transition regime from low to high, and a threshold 3 is computed with respect to traffic intensities in the transition regime from high to medium. These thresholds take into consideration the lead and lag times required by the offloading mechanism. These lead and lag times are a combination of the reaction time of the dynamic offloading mechanisms, the statistical pattern of the traffic, and the web site's share of the capacity at the home server among all other web sites using this server as a home server.

For each web site, the on-line transitions from low to high regimes and from high to low regimes are detected. As previously discussed, the detection can be carried out using several statistical techniques such as the change point detection based on marginal distribution or the moving average technique.

For each web site, the offloading mechanism is either turned on when the traffic intensity exceeds threshold 2 or turned off when the traffic intensity falls below threshold 3. The destinations to which the traffic is offloaded and the fractions of traffic to send to these destinations are defined by the solution of the linear programming problem solved previously.

Figure 19:
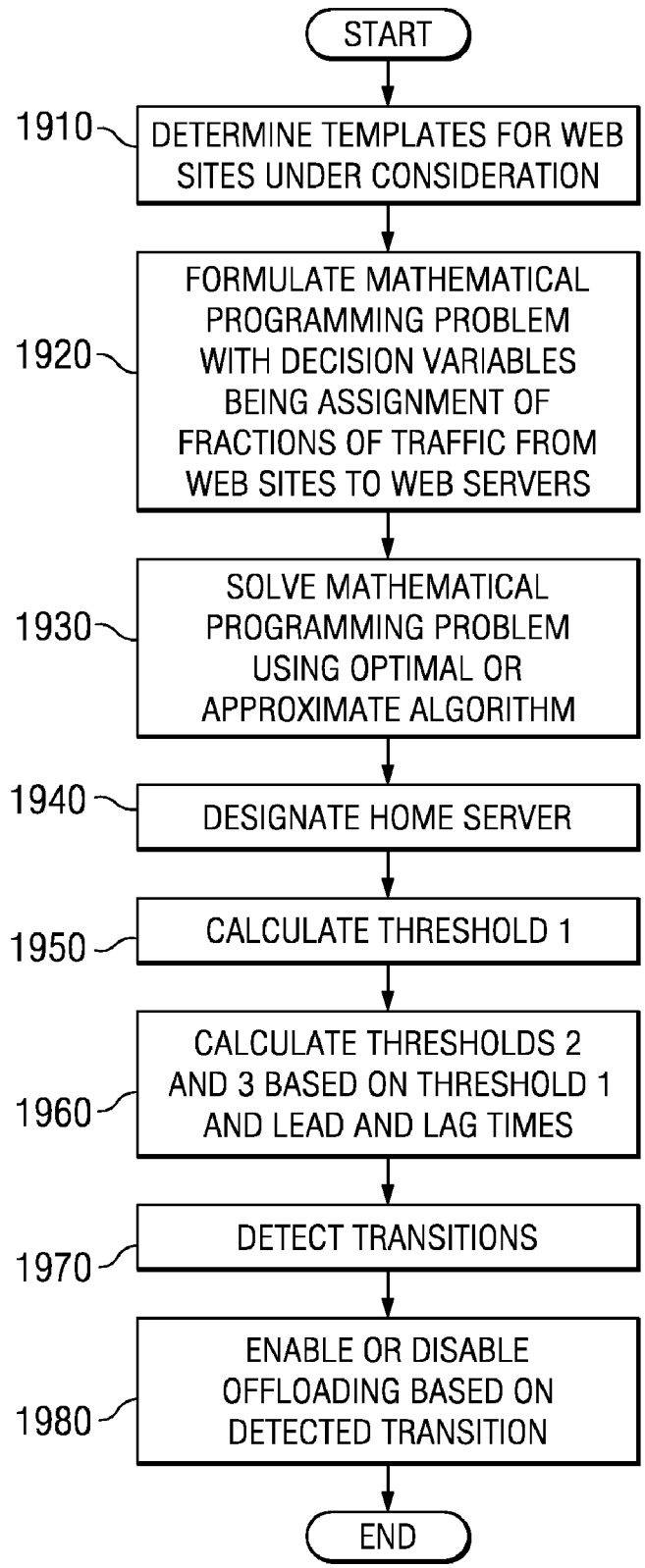
FIG. 19 is a flowchart outlining an exemplary operation of the present invention for a combination of both co-location and offloading.

FIG. 19 is a flowchart outlining an exemplary operation of the present invention for a combination of both co-location and offloading. As shown in FIG. 19, the operation starts with the templates for each of the web sites under consideration being determined (block 1910). A mathematical programming problem is then formulated in which the decision variables are the assignment of fractions of traffic from web sites to web servers (block 1920). The constraints of this mathematical programming problem are the capacity limitation for any server at any time epochs. The objective function is the sum of the costs of all web servers to which at least one web site is assigned.

The mathematical programming problem, once formulated, is solved using optimal or approximation algorithms (block 1930). Then, for each web site, a web server is designated as its home server among those to which some portion of the traffic is assigned (block 1940) and a threshold 1 of the web site is defined as its portion of the traffic assigned to it's home server (block 1950).

For each web site, a threshold 2 is computed with respect to the traffic intensities in the transition regime from low to high, and a threshold 3 is computed with respect to traffic intensities in the transition regime from high to medium (block 1960). These thresholds take into consideration the lead and lag times required by the offloading mechanism. For each web site, the on-line transitions from low to high regimes and from high to low regimes are detected (1970). The offloading mechanism is either turned on when the traffic intensity exceeds threshold 2 or turned off when the traffic intensity falls below threshold 3 (1980).

Figure 20:
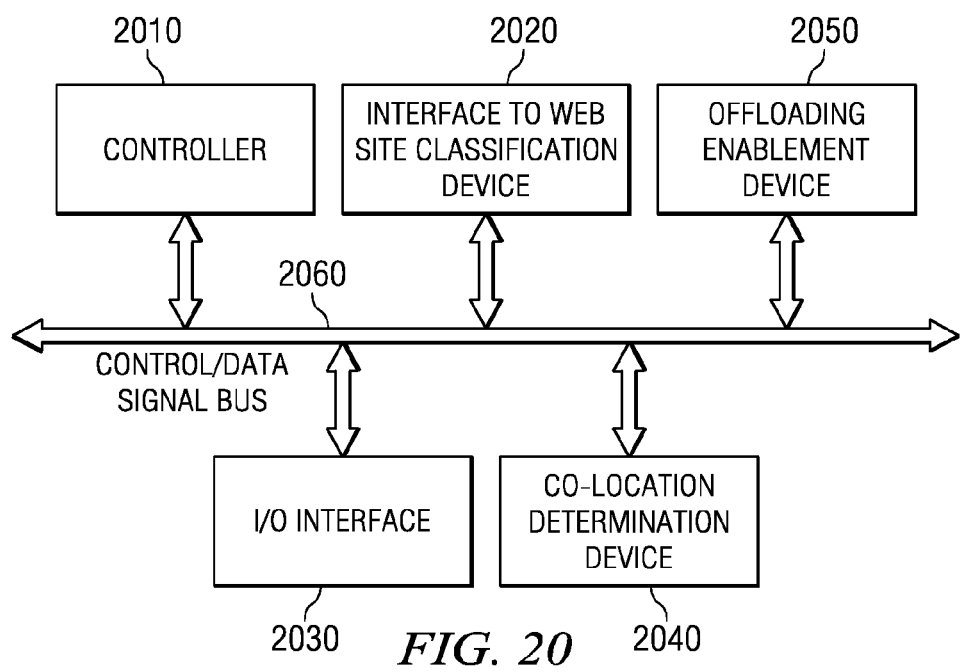
FIG. 20 is a block diagram of a resource allocation determination system.

FIG. 20 is a block diagram of a resource allocation determination system. As shown in FIG. 20, the resource allocation determination system includes a controller 2010, an interface 2020 to the web site classification device of FIG. 11, an input/output interface 2030 for sending and receiving resource allocation messages to and from web servers and offloading mechanisms, a co-location determination device 2040, and an offloading enablement device 2050. The elements 2010-2050 are in communication with one another via the control/data signal bus 2060.

The elements shown in FIG. 20 may be implemented in hardware, software, or any combination of hardware and software. In a preferred embodiment, the elements 2010-2050 are implemented as software instructions executed by one or more processors.

The controller 2010 controls the overall operation of the resource allocation determination system and orchestrates the operation of the other elements 2020-2050. The controller 2010 receives request for determination of co-location, offloading, or a combination of co-location and offloading, via the interface 2030 and instructs the elements 2040-2050 to determine co-location and/or offloading using the templates for the web sites as obtained from the web site classification device via interface 2020. The elements 2040 and 2050 perform operations for determining co-location of web sites and/or offloading in the manners previously described and return results to the controller 2010. The controller 2010 may then transmit messages to web servers and/or offloading mechanisms for performing operations to co-location web sites and/or offload traffic to other web servers.

Thus, the present invention provides apparatus and methods for determining the co-location of web sites based on templates of traffic patterns identified using clustering, profiling, and/or classification of web site traffic data obtained from traffic logs of the web sites. Moreover, the present invention provides apparatus and methods for determining offloading of traffic from a web server to other web servers based on such templates of traffic patters for web sites. With the present invention, dynamic determination of optimal co-location of web sites and offloading may be performed to obtain a required guaranteed quality of service.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed:

1. A computer program product stored in a non-transitory recordable type medium having instructions embodied therein that are executable by a computer for allocating resources to a plurality of web sites, the computer program product, comprising:
   instructions for identifying a traffic pattern for each of the plurality of web sites, wherein the traffic pattern is a selected measurement of data selected from a group consisting of load/request patterns, user navigation patterns, and site hypertext structures;
   instructions for identifying at least one of a plurality of traffic pattern graphs for each of the plurality of web sites based on the traffic pattern, wherein a traffic pattern graph in the plurality of traffic pattern graphs is a function of time series data values for the selected measurement for the traffic pattern;
   instructions for identifying at least two of the plurality of web sites that are candidates for co-location of traffic associated with the at least two of the plurality of web sites on a set of resources based on the at least one of the plurality of traffic pattern graphs identified for the at least two of the plurality of web sites, wherein the instructions for identifying the at least two of the plurality of web sites that are candidates for co-location of traffic include instructions for formulating an integer programming problem having decision variables that are an assignment of the plurality of web sites to a plurality of web servers, a constraint that is a capacity limitation for any server at any time epoch, and an objective function that is a sum of costs of all web servers to which at least one web site is assigned; and
   instructions for allocating the set of resources to handle the co-location of the traffic associated with the at least two of the plurality of web sites based on identifying the at least two of the plurality of web sites that are the candidates for the co-location of the traffic associated with the at least two of the plurality of web sites on the set of resources.

2. The computer program product of claim 1, wherein the instructions for allocating the set of resources to the at least two of the plurality of web sites include:
   instructions for calculating, for at least one particular web site in the plurality of web sites, a first threshold based on the at least one of the plurality of traffic pattern graphs identified for the at least one particular web site in the plurality of web sites;
   instructions for calculating a second threshold by subtracting a lead time of an offload mechanism to the first threshold, wherein offloading of traffic is enabled when a traffic intensity for the at least one particular web site in the plurality of web sites meets or exceeds the second threshold; and
   instructions for calculating a third threshold by adding a lag time of the offload mechanism to the first threshold, wherein offloading of traffic is disabled when the traffic intensity of the at least one particular web site in the plurality of web sites meets or falls below the third threshold.

3. The computer program product of claim 2, further comprising:
   fourth instructions for monitoring traffic of the at least one particular web site in the plurality of web sites on a web server to determine when the traffic intensity exceeds the second threshold; and
   instructions for offloading at least a portion of the traffic on the web server to another web server when the traffic intensity of the at least one particular web site in the plurality of web sites exceeds the second threshold.

4. The computer program product of claim 3, further comprising:
   instructions for monitoring the traffic of the at least one particular web site in the plurality of web sites on the web server to determine when the traffic intensity falls below the third threshold; and instructions for disabling the offloading of the traffic on the web server to the another web server when the traffic intensity of the at least one particular web site in the plurality of web sites falls below the third threshold.

5. The computer program product of claim 1, wherein the instructions for identifying the at least two of the plurality of web sites that are the candidates for the co-location of the traffic associated with the at least two of the plurality of web sites on the set of resources include:
   instructions for identifying a first web site of the plurality of web sites having peaks in traffic at a first set of time periods; and
   instructions for identifying a second web site of the plurality of web sites having peaks in traffic at a second set of time periods different from the first set of time periods.

6. The computer program product of claim 5, wherein the second web site has a trough in traffic at approximately a same time as the first web site has a peak in traffic.

7. The computer program product of claim 1, wherein the instructions for identifying the at least two of the plurality of web sites that are the candidates for the co-location of the traffic associated with the at least two of the plurality of web sites on the set of resources include:
   instructions for identifying the at least two of the plurality of web sites such that a capacity for traffic of a web server on which the at least two of the plurality of web sites are located remains constant.

8. The computer program product of claim 1, wherein the instructions for identifying the at least two of the plurality of web sites that are the candidates for the co-location of the traffic associated with the at least two of the plurality of web sites on the set of resources include:
   instructions for identifying the at least two of the plurality of web sites such that a total cost of all web servers hosting the plurality of web sites is minimized.

9. The computer program product of claim 1, wherein the instructions for identifying the at least two of the plurality of web sites that are the candidates for the co-location of the traffic associated with the at least two of the plurality of web sites on the set of resources include:
   instructions for formulating an integer programming problem having decision variables that are an assignment of the plurality of web sites to a plurality of web servers, a constraint that is a capacity limitation for any server at any time epoch, and an objective function that is an increasing function of minimum distances between server capacity and peak load at different ones of the plurality of web servers.

\* \* \* \* \*